(12) United States Patent
Jung et al.

(10) Patent No.: US 11,284,774 B2
(45) Date of Patent: Mar. 29, 2022

(54) DISHWASHER WITH HEAT PUMP

(71) Applicant: LG Electronics Inc., Seoul (KR)

(72) Inventors: Changyoon Jung, Seoul (KR);
Sangheon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 16/698,357

(22) Filed: Nov. 27, 2019

(65) Prior Publication Data

US 2020/0163529 A1 May 28, 2020

(30) Foreign Application Priority Data

Nov. 28, 2018 (KR) ........................ 10-2018-0150019

(51) Int. Cl.
*A47L 15/42* (2006.01)
*A47L 15/48* (2006.01)
*A47L 15/00* (2006.01)

(52) U.S. Cl.
CPC ....... *A47L 15/4287* (2013.01); *A47L 15/0031* (2013.01); *A47L 15/4223* (2013.01); *A47L 15/4285* (2013.01); *A47L 15/483* (2013.01); *A47L 15/486* (2013.01)

(58) Field of Classification Search
CPC .............................................. A47L 15/00–508
See application file for complete search history.

(56) References Cited

U.S. PATENT DOCUMENTS

| | | | | |
|---|---|---|---|---|
| 5,601,660 A | * | 2/1997 | Jeon ..................... | A47L 15/4208 134/10 |
| 2015/0068056 A1 | * | 3/2015 | Jung ..................... | A47L 15/488 34/218 |
| 2015/0337859 A1 | * | 11/2015 | Qi ......................... | F04D 29/448 415/177 |

(Continued)

FOREIGN PATENT DOCUMENTS

| CN | 101440998 A | * | 5/2009 | |
|---|---|---|---|---|
| EP | 1578244 B1 | * | 11/2009 | ........... A47L 15/486 |

(Continued)

OTHER PUBLICATIONS

Esam Jassim, "Spiral Coil Heat Exchanger—Experimental Study", May 3, 2016, Proceeding of the 3rd International Conference on Fluid Flow, Heat and MassTransfer (FFHMT'16), Paper No. 107, https://avestia.com/FFHMT2016_Proceedings/files/paper/107.pdf (Year: 2016).*

(Continued)

*Primary Examiner* — Michael E Barr
*Assistant Examiner* — Omair Chaudhri
(74) *Attorney, Agent, or Firm* — Fish & Richardson P.C.

(57) ABSTRACT

The present disclosure relates to a dishwasher having a heat pump, including a dishwasher body provided with a tub configured with a washing space therein and a sump provided at a bottom of the tub to temporarily accommodate washing water; a heat pump having a compressor, an evaporator, an expansion apparatus, and a condenser provided on an inner bottom surface of the tub to exchange heat with washing water inside the tub; and a controller that controls the heat pump to be driven to increase the temperature of the washing water inside the tub. As a result, the heating time of washing water may be shortened.

17 Claims, 17 Drawing Sheets

(56) References Cited

U.S. PATENT DOCUMENTS

| | | | |
|---|---|---|---|
| 2017/0188786 A1* | 7/2017 | Lee | A47L 15/4287 |
| 2018/0028042 A1* | 2/2018 | Heinle | A47L 15/46 |
| 2020/0187749 A1* | 6/2020 | Bertram | D06F 39/006 |

FOREIGN PATENT DOCUMENTS

| | | | |
|---|---|---|---|
| EP | 2465405 A2 * | 6/2012 | A47L 15/4214 |
| EP | 2978360 | 8/2017 | |
| EP | 3082554 B1 * | 10/2017 | A47L 15/483 |
| KR | 100770071 | 10/2007 | |
| KR | 101037921 | 5/2011 | |
| WO | WO-2015074834 A1 * | 5/2015 | A47L 15/483 |

OTHER PUBLICATIONS

George Arfkin et al., "Heat Transfer", 1984, Science Direct, University Physics, pp. 1, 6-7, https://www.sciencedirect.com/topics/physics-and-astronomy/fourier-law (Year: 1984).*

Nick Connor, "What is Fourier's Law of Thermal Conduction—Definition", May 22, 2019, Thermal Engineering, https://www.thermal-engineering.org/what-is-fouriers-law-of-thermal-conduction-definition/ (Year: 2019).*

Office Action in German Appln. No. 102019131960.9, dated Jan. 24, 2022, 10 pages (with English translation).

\* cited by examiner

DISHWASHER WITH HEAT PUMP

CROSS-REFERENCE TO RELATED APPLICATIONS

Pursuant to 35 U.S.C. § 119(a), this application claims the benefit of earlier filing date and right of priority to Korean Application No. 10-2018-0150019, filed on Nov. 28, 2018, the contents of which is incorporated by reference herein in its entirety.

TECHNICAL FIELD

The present disclosure relates to a dishwasher having a heat pump.

BACKGROUND

As is known, dishwasher is a type of appliance that cleans dishes and/or cooking utensils using detergent and washing water. Such a dishwasher includes a dishwasher body typically configured with a washing space therein and a door that opens and closes the washing space.

The dishwasher body includes a rack for accommodating and supporting dishes, a spray arm for spraying washing water to the rack, a supply pump for supplying washing water to the spray arm, and a drain pump for draining the washing water of the sump to an outside of the dishwasher body.

The dishwasher includes various washing courses including some or all of pre-washing, washing, rinsing, heating rinsing and drying processes.

On the other hand, the dishwasher body is provided with a heating unit for heating the washing water. The heating unit, for example, is composed of an electric heater for generating heat when power is applied to heat washing water.

However, in a dishwasher in the related art, washing water is heated using an electric heater, and thus there is a problem that a relatively large amount of power is consumed when washing water is heated. Furthermore, washing water heated to wash dishes is discharged to an outside of the dishwasher in a state having a high temperature (energy), and thus there is a problem that energy loss occurs.

In consideration of this problem, some of the dishwashers are designed to have a waste heat recovery device for recovering the waste heat of the dishwasher using a heat pump to heat water supply, and some of the other dishwashers are designed to arrange a condenser of the heat pump on a bottom surface of a cleaning tank to heat washing water inside the cleaning tank.

However, in a waste heat recovery device of a dishwasher using such a heat pump, in order to recover heat from washing water discharged from a dishwasher, a plurality of heat exchange apparatuses and a long passage for the movement of washing water are configured separately from the dishwasher, and thus there is a problem that the number of parts for heating of washing water and waste heat recovery and the size thereof are increased and the configuration and control thereof are complicated.

In addition, washing water to be supplied is heated using the heat of the washing water discharged after a washing process or after a rinsing process, and thus there is a problem that the washing water to be supplied cannot be preheated before the washing process. Due to this, there is a problem that it takes a relatively long time to heat washing water.

Moreover, in a dishwasher arranged with a condenser under a cleaning tank to heat washing water inside the cleaning tank, the cleaning tank should be configured to be withdrawable from the dishwasher body to the outside, and thus a clearance for withdrawing the cleaning tank is generated between the condenser and the cleaning tank, and as a result, there is a problem that heat exchange between the condenser and the washing water of the cleaning tank is insufficient and the operating efficiency of the heat pump is deteriorated.

In addition, the cleaning tank is accommodated inside the dishwasher body, and then a washing tank inside the cleaning tank is heated by the condenser after water is supplied to an inside of the cleaning tank, and thus there is a problem that a relatively long time is required to heat the washing water inside the cleaning tank.

PRIOR ART DOCUMENTS

Patent Documents (Patent Document 1) KR10-1037921 B1
(Patent Document 2) KR10-0770071 B1

SUMMARY

Accordingly, an aspect of the present disclosure is to provide a dishwasher having a heat pump capable of shortening the heating time of washing water.

Furthermore, another aspect of the present disclosure is to provide a dishwasher having a heat pump capable of suppressing heat loss from being generated during the heating of washing water.

In addition, still another aspect of the present disclosure is to provide a dishwasher having a heat pump capable of eliminating the use of an additional heat exchange apparatus for heating washing water.

Moreover, yet still another aspect of the present disclosure is to provide a dishwasher having a heat pump capable of promoting the cooling of cleaning space.

In order to achieve the foregoing objectives, the present disclosure a dishwasher having a heat pump, including a dishwasher body provided with a tub configured with a washing space therein and a sump provided at a bottom of the tub to temporarily accommodate washing water; a heat pump having a compressor, an evaporator, an expansion apparatus, and a condenser provided on an inner bottom surface of the tub to exchange heat with washing water inside the tub; and a controller that controls the heat pump to be driven to increase the temperature of the washing water inside the tub.

According to an embodiment, the dishwasher may further include a connection pipe that supplies washing water into the washing space, and an open-close valve that opens and closes a passage of the connection pipe, wherein the controller controls the open-close valve to supply washing water into the tub so that the condenser can be immersed in the washing water when the washing water is heated by the condenser, and controls the compressor to be driven.

According to an embodiment, the controller may control the compressor to be driven to heat a bottom surface of the tub by the condenser when drying process is carried out.

According to an embodiment, the dishwasher body may be provided with a water jacket disposed to accommodate washing water therein and exchange heat with the tub, and the water jacket may be provided with a water pipe into which washing water flows and a water valve that opens and closes the water pipe, and the controller may control the water valve to open the water pipe so as to accommodate washing water into the water jacket when the drying process is carried out.

According to an embodiment, the dishwasher may further include a circulation fan that circulates air inside the tub, wherein the controller controls the circulation fan to be driven when the drying process is carried out.

According to an embodiment, the heat pump may be provided with a refrigerant passage switching valve provided on a discharge side of the compressor to switch a passage of refrigerant, and the controller may control the refrigerant passage switching valve to move the refrigerant of the compressor to the evaporator when a predetermined time point elapses when the drying process is carried out.

According to an embodiment, the dishwasher may further include a blower fan provided at one side of the evaporator, wherein the controller controls the blower fan to be driven during the operation of the compressor.

According to an embodiment, the evaporator may be provided to exchange heat with water inside the water tank at an inside of the water tank provided in the dishwasher body.

According to an embodiment, the condenser may be configured in a spiral shape, and disposed in contact with a bottom surface of the tub.

More specifically, the condenser may be configured in a spiral shape, and disposed in contact with a bottom surface of the tub on a circumference of an upper opening of the sump.

According to an embodiment, the condenser may be provided with a tub condenser provided inside the tub and a sump condenser provided inside the sump, and the heat pump may further include a tub condenser valve that opens and closes an inlet side passage of the tub condenser; and a sump condenser valve that opens and closes an inflow side passage of the sump condenser, and may further include a mode selection unit that selects any one of a plurality of operation modes, and the controller may control the tub condenser valve and the sump condenser valve, respectively, according to an operation mode selected by the mode selection unit.

According to an embodiment, the operation mode may have a washing water heating mode that heats washing water, and the washing water heating mode may include a first heating mode that heats the washing water of the tub using the tub condenser, and the controller may control the tub condenser valve to move refrigerant to the tub condenser when the first heating mode is selected.

According to an embodiment, the operation mode may have a washing water heating mode that heats washing water, and the washing water heating mode may include a second heating mode that heats the washing water of the sump using the sump condenser, and the controller may control the sump condenser valve to move refrigerant to the sump condenser when the second heating mode is selected.

According to an embodiment, the washing water heating mode may include a third heating mode that heats the washing water of the tub and the washing water of the sump using the tub condenser and the sump condenser, and the controller may control the tub condenser valve and the sump condenser valve, respectively, to move refrigerant to the tub condenser and the sump condenser, respectively, when the third heating mode is selected.

According to an embodiment, the operation mode may include a drying mode that heats a bottom surface of the tub, and the controller may control the tub condenser valve to move refrigerant to the tub condenser when the drying mode is selected.

According to an embodiment, the evaporator may be provided to exchange heat with water inside the water tank at an inside of the water tank provided in the dishwasher body, and the water tank may be provided at an upper side of the compressor.

According to an embodiment, a heat transfer member that transfers the heat energy of the compressor to the water tank may be provided between the water tank and the compressor, and the heat transfer member may be formed to move water therein, and the heat transfer member may be provided with a heat exchange unit provided to exchange heat on a circumference of the compressor.

According to an embodiment, the tub may be provided with a circulation duct that circulates air therein, and a circulation fan may be provided inside the circulation duct.

Here, a suction port through which air is sucked may be disposed in an upper region of the tub, and a discharge port through which air is discharged may be disposed in a lower region of the tub, and the circulation fan may be installed at the suction port.

According to an embodiment, the compressor and the evaporator may be disposed in the same space inside the dishwasher body.

As described above, according to an embodiment of the present disclosure, a condenser may be provided on an inner bottom surface of the tub to directly heat washing water, thereby shortening the heating time of the washing water. As a result, it may be possible to suppress an overall dish washing time from being prolonged due to the heating of the washing water.

Furthermore, the condenser provided on the bottom surface of the tub may be in direct contact with washing water to directly heat the washing water, thereby suppressing energy loss from being generated while heating the washing water.

In addition, during the drying process of dishes, the bottom surface of the tub may be heated to heat air inside the tub, thereby quickly increasing the temperature inside the tub. As a result, the drying of dishes may be promoted.

Moreover, a tub condenser provided on a bottom surface of the tub and a sump condenser provided inside a sump, thereby selectively heating washing water.

Besides, the tub condenser and the sump condenser may be used at the same time to heat washing water, thereby shortening the heating time of the washing water. As a result, an overall dish washing time may be shortened.

Furthermore, washing water and the condenser may be configured to directly heat the washing water, thereby eliminating the use of an additional heat exchanger for heating washing water.

In addition, a refrigerant passage switching valve for switching a passage of refrigerant may be provided on a discharge side of the compressor, and the refrigerant of the compressor may be moves to the evaporator at a predetermined time during the drying process, thereby promoting cooling inside the tub by the latent heat absorption action of the condenser of the tub.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure.

FIG. 8 is a cross-sectional view of a water jacket region of the dishwasher in

FIG. 1.

DETAILED DESCRIPTION

Figure 1:
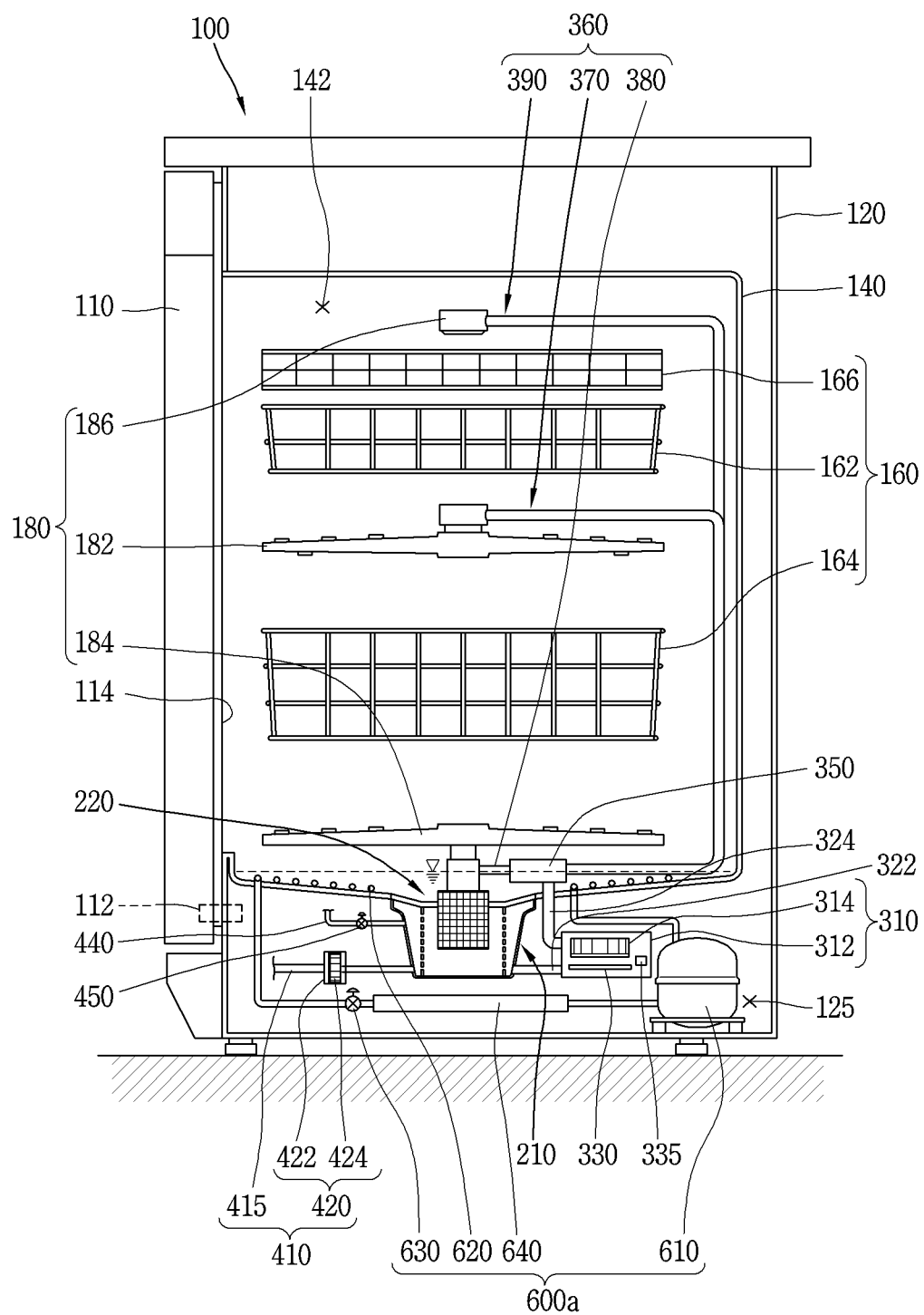
FIG. 1 is a cross-sectional view of a dishwasher having a heat pump according to an embodiment of the present disclosure.

Hereinafter, preferred embodiments disclosed in the present disclosure will be described in detail with reference to the accompanying drawings. Even in different embodiments according to the present disclosure, the same or similar reference numerals are designated to the same or similar configurations, and the description thereof will be substituted by the earlier description. A singular representation used in the present disclosure may include a plural representation as far as it represents a definitely different meaning from the context. In describing the embodiments disclosed herein, moreover, the detailed description will be omitted when specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

Figure 2:
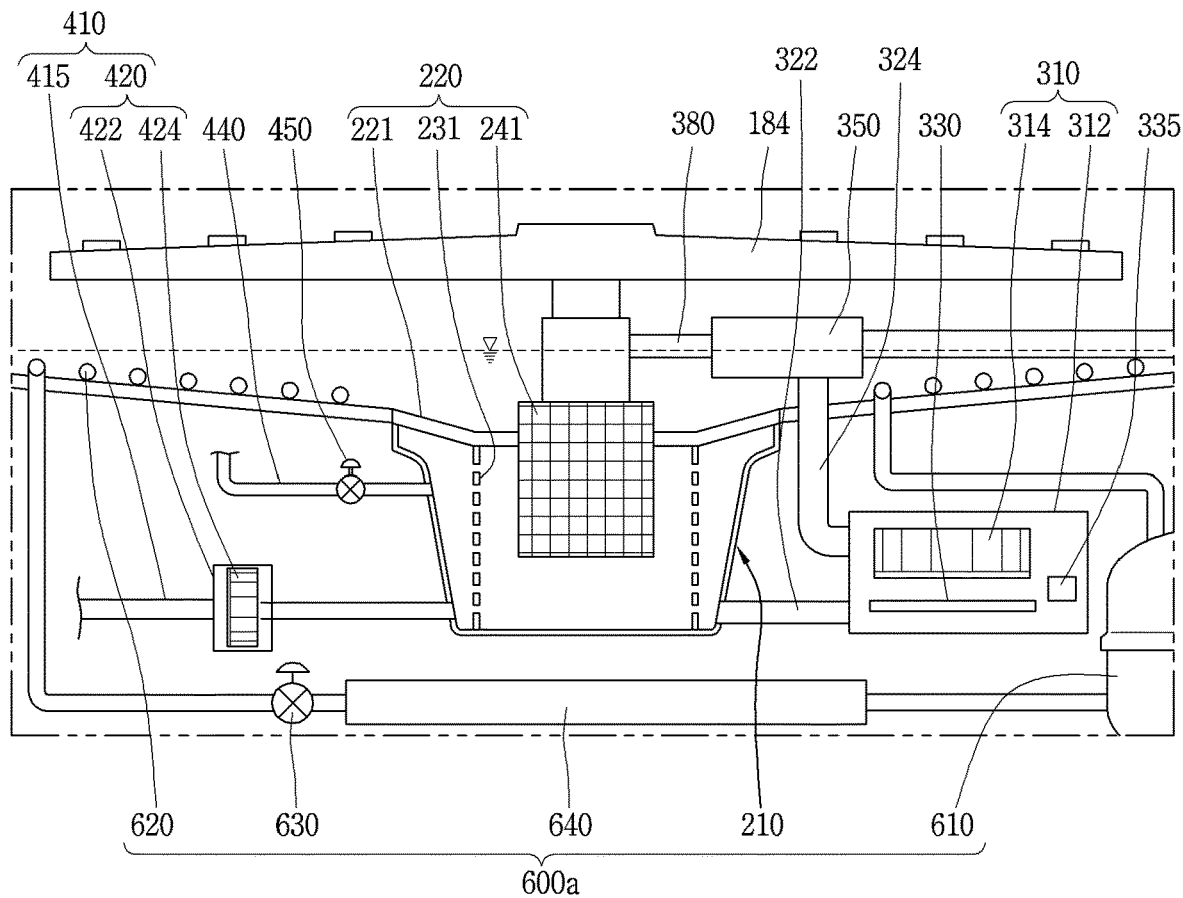
FIG. 2 is a partially enlarged view of FIG. 1.
Figure 3:
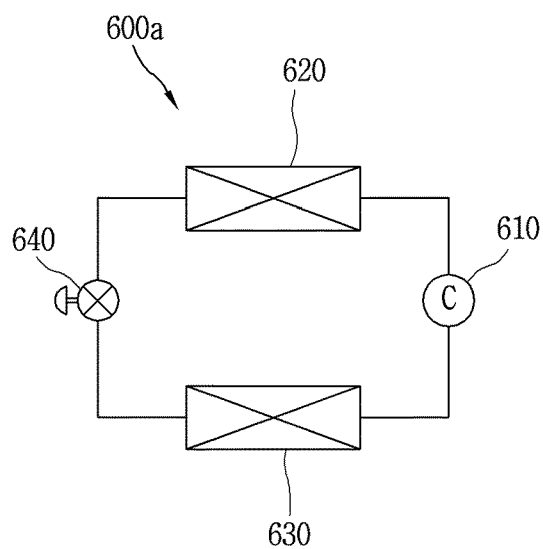
FIG. 3 is a cycle diagram of the heat pump in FIG. 1.

FIG. 1 is a cross-sectional view of a dishwasher having a heat pump according to an embodiment of the present disclosure, and FIG. 2 is a partially enlarged view of FIG. 1, and FIG. 3 is a cycle diagram of the heat pump in FIG. 1. As illustrated in FIGS. 1 and 2, a dishwasher according to an embodiment of the present disclosure includes a dishwasher body 100 configured with a washing space 142 therein and a door 110 that opens and closes the washing space 142.

The dishwasher body 100 includes a cabinet 120 forming an appearance. The cabinet 120 is implemented in a substantially rectangular parallelepiped shape. A tub 140 is disposed inside the cabinet 120. The tub 140 forms a washing space 142 of dishes therein. The tub 140 has a rectangular parallelepiped shape of which a substantially front surface is open. A door 110 is provided on a front surface of the dishwasher body 100. The door 110 is configured to rotate vertically around a hinge 112 provided at the bottom. The door 110 hermetically blocks the front opening of the tub 140. A gasket 114 is provided between the door 110 and the dishwasher body 100.

The rack 160 for accommodating dishes is provided inside the tub 140. A plurality of racks 160 are provided therein. The racks 160 are typically spaced apart in a vertical direction. The racks 160 include an upper rack 162 disposed in an upper region of the tub 140. The racks 160 include a lower rack 164 provided in a lower region of the tub 140. The racks 160 include a top rack 166 provided above the upper rack 162. An inside of the tub 140 is provided with a spray arm 180 for spraying washing water. The spray arm 180 has an upper spray arm 182 for spraying washing water toward the upper rack 162. The spray arm 180 has a lower spray arm 184 for spraying washing water toward the lower rack 164. The spray arm 180 includes a top spray arm 186 for spraying washing water toward the top rack 166.

A bottom surface of the tub 140 is disposed to be inclined. A sump 210 is provided at the bottom of the tub 140. The sump 210 has an upper open cylindrical shape. The sump 210 has an upper opening corresponding to a relatively low region of the bottom surface of the tub 140. As a result, the washing water of the tub 140 may flow into the sump 210 through the upper opening of the sump 210. The sump 210 is provided with a filter unit 220 to suppress the movement of foreign matter in washing water. The filter unit 220 includes, for example, a first filter 221 provided at an upper opening of the sump 210. The filter unit 220 has a second filter 231 provided inside the sump 210. The filter unit 220 includes a third filter 241 disposed inside the second filter 231. The sump 210 is provided with a circulation pump 310 for pumping and circulating the washing water of the sump 210.

The circulation pump 310 has a housing 312 and an impeller 314 rotatably provided inside the housing 312. An electric heater 330 is installed inside the housing 312 to heat washing water by generating heat when power is applied. The inside of the housing 312 is provided with a temperature sensor 335 for sensing the temperature of washing water. In the present embodiment, it is illustrated a case in which the electric heater 330 is provided inside the circulation pump 310, but the electric heater 330 may be provided inside the sump 210. In addition, the electric heater 330 may not be installed in the circulation pump 310 and may not be installed inside the sump 210. Hereinafter, a case in which the electric heater 330 is installed inside the circulation pump 310 will be described as an example. One side of the housing 312 is connected to a suction pipe 322 for sucking the washing water of the sump 210. The other side of the housing 312 is connected to a discharge pipe 324 for discharging washing water. The discharge pipe 324 is provided with a passage switching valve 350 for switching a passage of washing water. The passage switching valve 350 is connected to a washing water guide 360 for guiding washing water. The washing water guide 360 has an upper guide 370 connected to the upper spray arm. The washing water guide 360 has a lower guide 380 connected to the lower spray arm. The washing water guide 360 has a top guide 390 connected to the top rack 166.

The sump 210 is provided with a connection pipe 440 connected to allow washing water to flow into the sump 210. The connection pipe 440 is provided with an open-close valve 450 that opens and closes an internal passage of the connection pipe 440. The sump 210 is connected to a drain unit 410 for draining washing water. The drain unit 410 includes a drain passage 415 forming a passage of washing water and a drain pump 420 provided in the drain passage 415 to pump washing water. The drain pump 420 has a housing 422 and an impeller 424 rotatably provided inside the housing 422. The dishwasher body 100 includes a heat pump 600a for heating washing water.

As illustrated in FIG. 3, the heat pump 600a includes a compressor 610 for compressing refrigerant, a condenser 620 for condensing refrigerant by heat radiation, an expansion apparatus 630 for depressurizing and expanding refrigerant, and an evaporator 640 for allowing refrigerant to absorb surrounding latent heat to evaporate. The compressor 610, the condenser 620, the expansion apparatus 630, and the evaporator 640 are connected to communicate with one another by a refrigerant pipe to circulate (flow) refrigerant. The compressor 610 is disposed in the machine room 125 disposed between the cabinet 120 and the tub 140.

On the other hand, the condenser 620 is installed on an inner bottom surface (bottom surface) of the tub 140. The condenser 620 may be implemented, for example, in a spiral shape. The condenser 620 may be disposed in a spiral shape on a circumference of the upper opening of the sump 210. The condenser 620 may be disposed to be in contact with the bottom surface of the tub 140. As a result, the bottom surface of the tub 140 may be uniformly heated. The tub 140 is provided with a circulation fan 150 for circulating air therein.

The evaporator 640 is provided inside the machine room 125. The compressor 610 and the evaporator 640 are provided in the same space (machine room 125), thereby allowing the evaporator 640 to absorb the heat energy released from the compressor 610 to promote the evaporation of refrigerant therein. The compressor 610 may promote cooling by the latent heat absorption of the evaporator 640 to reduce the load.

Figure 4:
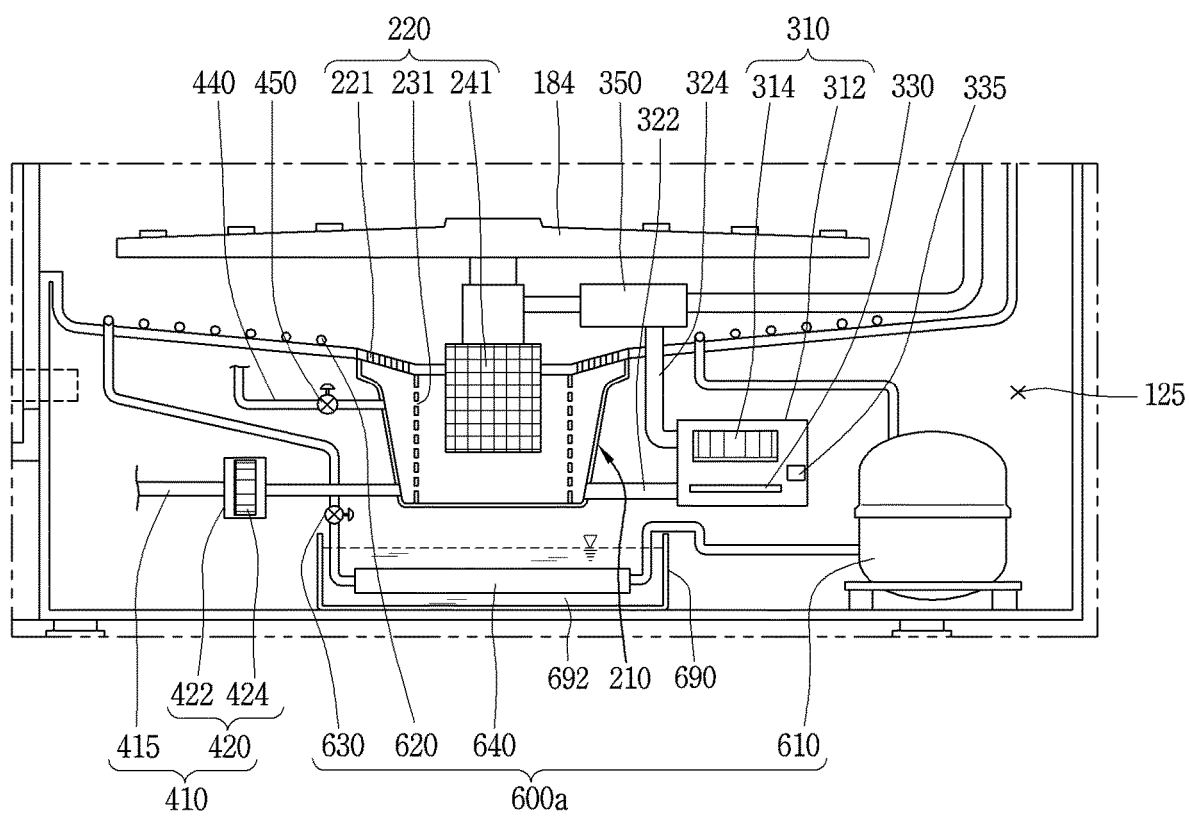
FIGS. 4 through 6 are modified examples of an evaporator in FIG. 2.
Figure 5:
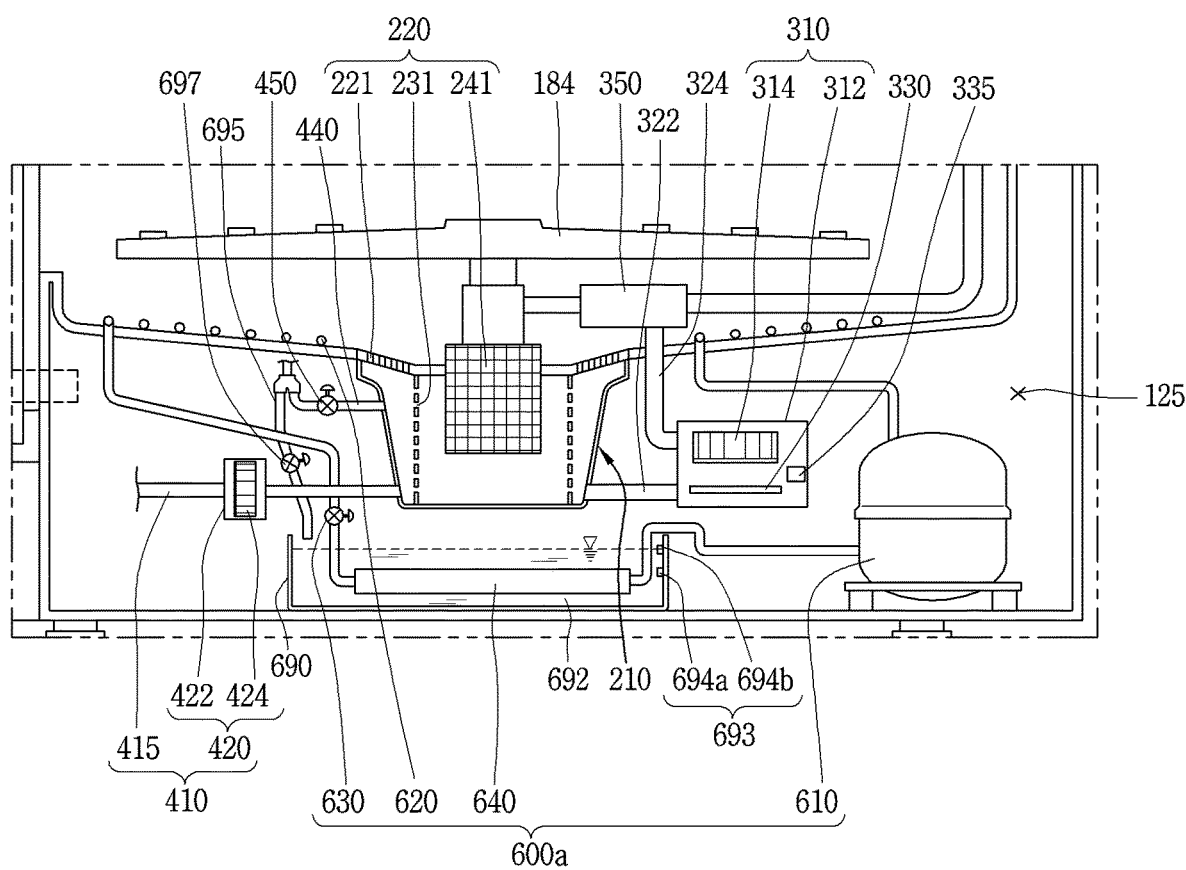
Figure 6:
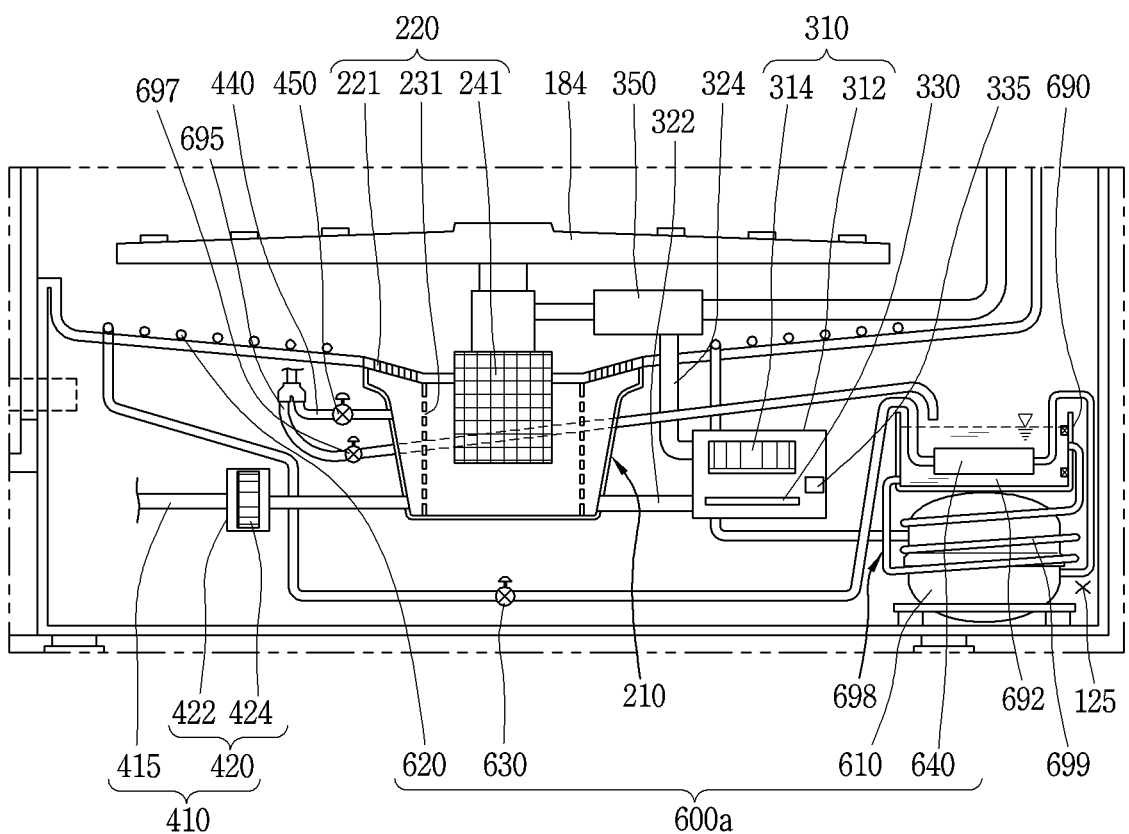

On the other hand, FIGS. 4 through 6 are modified examples of an evaporator in FIG. 2. As illustrated in FIG. 4, the evaporator 640 may be configured to exchange heat with water. A water tank 690 may be provided inside the machine room 125. The water tank 690 may be provided, for example, under the sump 210.

The water tank 690 may be implemented, for example, in an upwardly open cylindrical shape. Water 692 is provided inside the water tank 690. The evaporator 640 is accommodated in the water tank 690 so as to exchange heat with the water 692. According to such a configuration, the latent heat absorption of the evaporator 640 may be facilitated when the heat pump 600a is driven.

As illustrated in FIG. 5, the water tank 690 may be provided with a water level sensing unit 693 for sensing a level of the water 692. The water level sensing unit 693 may include, for example, a lower sensing unit 694a and an upper sensing unit 694b spaced apart from each other in a vertical direction of the water tank 690. The water tank 690 may be provided with a water supply pipe 695 for supplying water into the water tank 690. The water supply pipe 695 may be branched from, for example, the connection pipe 440. The water pipe 695 may be provided with a water pipe valve 697 that opens and closes an internal passage. According to such a configuration, water supply inside the water tank 690 may be controlled based on the water level sensing result of the water level sensing unit 693. More specifically, when a low water level is sensed by the lower sensing unit 694a, the water supply pipe valve 697 may be opened to supply water to the water tank 690. When a high water level is sensed by the upper sensing unit 694b, the water supply pipe valve 697 may be blocked to stop water supply to the water tank 690.

As illustrated in FIG. 6, the water tank 690 may be configured to exchange heat with the compressor 610. The water tank 690 may be disposed, for example, above the compressor 610. As a result, the temperature of the water tank 690 (water) may be increased by heat energy released from the compressor 610. The water tank 690 may be provided with a heat transfer member 698 for transferring the heat energy of the compressor 610. The heat transfer member 698 may be configured to exchange heat with the compressor 610 on one side thereof and heat exchange with the water tank 690 on the other side thereof.

The heat transfer member 698 may be implemented as, for example, a heat transfer pipe through which water is circulated. The heat transfer member 698 may be made of a metal member (for example, copper (CU) or aluminum (Al)). One end of the heat transfer member 698 is connected to communicate with one side of the water tank 690 and the other end thereof is disposed to be heat-exchanged to an outer surface of the compressor 610, and then connected to communicate with the other side of the water tank 690. The heat transfer member 698 may include a heat exchange unit 699 configured to exchange heat on a circumferential surface of the compressor 610. Here, both ends of the heat transfer member 698 may be connected to communicate with a height difference along a vertical direction of the water tank 690. In this configuration, when the compressor 610 is driven, the water 692 inside the heat exchange part 699 is heat-exchanged with the compressor 610 to raise the temperature and move upward by the convection phenomenon. By flowing into the interior of the 690, the water 692 inside the water tank 690 may be circulated and heated.

On the other hand, the heat transfer member 698, although not specifically shown in the drawing, for example, may have a rod shape with a metal member, and one end thereof may be brought into contact with the compressor 610 to exchange heat and the other end thereof may be configured to exchange heat with the water tank 690 (water). Accordingly, heat energy on a surface of the compressor 610 having a relatively high temperature may be transmitted to the water tank 690 through the heat transfer member 698 during the operation of the compressor 610.

Figure 7:
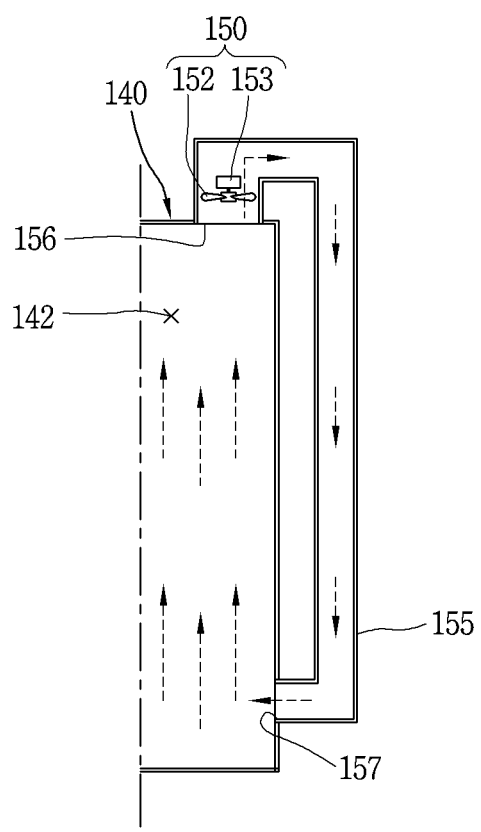
FIG. 7 is a view for explaining the operation of a circulation fan of the dishwasher in FIG. 1.

FIG. 7 is a view for explaining the operation of a circulation fan of the dishwasher in FIG. 1. As illustrated in FIG. 7, a circulation duct 155 through which the air of the tub 140 is circulated is connected to one side of the tub 140. One side of the circulation duct 155 may be connected to an upper portion of the tub 140 and the other end thereof may be connected to a side surface of the tub 140, for example. A suction port 156 may be disposed to pass through an upper surface (ceiling) of the tub 140, and a discharge port 157 may be disposed to pass through a side lower region of the tub 140. The circulation fan 150 may be disposed, for example, inside the circulation duct 155. When the circulation fan 150 starts to rotate, air inside the tub 140 may be sucked through the suction port 156, and may flow into the tub 140 through the discharge port 157. As a result, the circulation of air inside the tub 140 may be promoted. The circulation fan 150 includes, for example, a fan 152 having a plurality of blades and a motor 153 for rotationally driving the fan 152.

On the other hand, the dishwasher body 100 has a water jacket 500 for accommodating washing water therein. The water jacket 500 may be provided on, for example, one sidewall of the dishwasher body 100. The water jacket 500 may be provided, for example, between a sidewall of the cabinet 120 and a sidewall of the tub 140. In the present embodiment, it is illustrated a case where the water jacket 500 is provided on a left sidewall of the dishwasher body 100, but it is merely an example, and the water jacket 500 may be configured on another wall surface such as a right sidewall.

Figure 8:
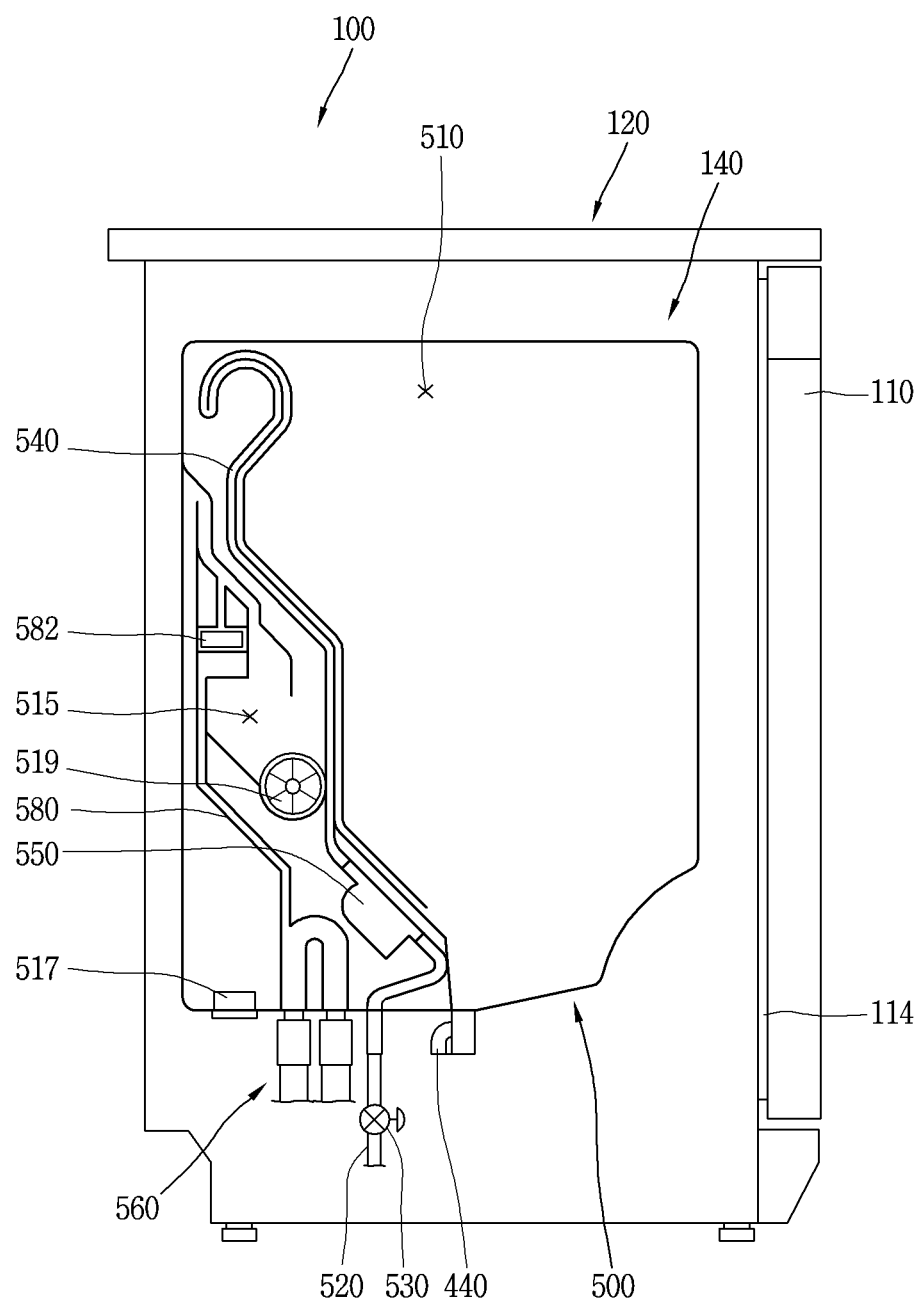

FIG. 8 is a cross-sectional view of a water jacket region of the dishwasher in FIG. 1. As illustrated in FIG. 8, the water jacket 500 includes a washing water storage unit 510 for accommodating washing water therein. A lower one side of the water jacket 500 is provided with a water pipe 520 to which washing water is supplied. The water pipe 520 is provided with a water valve 530 that opens and closes an internal passage. The water pipe 520 is connected to an inflow passage 540 through which washing water flows into the washing water storage unit 510. One end portion of the connection pipe 440 is connected to one side of the water pipe 520 below the water jacket 500 to supply the washing water of the washing water storage unit 510 to the sump 210. The inflow passage 540 is provided with a flow meter 550 to sense a flow rate of washing water. A condensation space 515 is disposed at the other side of the inflow passage 540. The other lower side of the water jacket 500 is provided with a discharge passage 560 for discharging washing water. The drain passage 415 includes the discharge passage 560.

The condensation space 515 is configured with a ventilation portion 517. The ventilation portion 517 communicates with an outside of the condensation space 515. A communication hole 519 is provided above the ventilation portion 517. The communication hole 519 communicates with an inside of the tub 140. A condensate discharge passage 580 is connected to the discharge passage 560. The condensate discharge passage 580 is provided with a drain valve 582. The drain valve 582 is configured with, for example, a one-way valve (check valve) to block fluid from moving upward and to allow the fluid to move downward.

Figure 9:
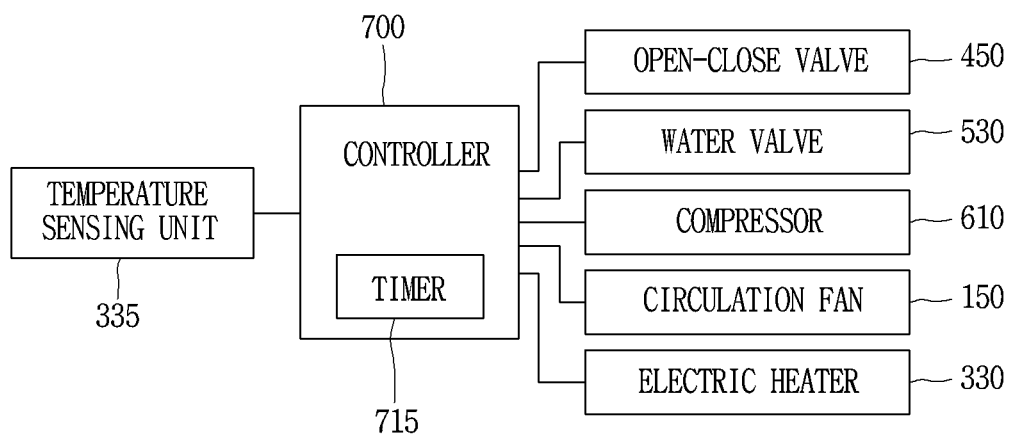
FIG. 9 is a control block diagram of the dishwasher in FIG. 1.

FIG. 9 is a control block diagram of the dishwasher in FIG. 1. As illustrated in FIG. 9, a dishwasher having a heat pump according to the present embodiment is configured to include a controller 700 implemented as a microprocessor provided with a control program. The controller 700 is communicatively connected to a temperature sensing unit 335 to control the temperature of the washing water. The controller 700 is configured to control the open-close valve 450 to supply a predetermined washing water into the tub 140 so that the condenser 620 can be immersed.

The controller 700 is configured to control the water valve 530 to accommodate washing water into the water jacket 500 when dishes are dried. The compressor 610 is controllably connected to the controller 700 to control refrigerant to be supplied to the condenser 620. An electric heater 330 for heating washing water by heating when power is applied is controllably connected to the controller 700. The circulation fan 150 is controllably connected to the controller 700. The controller 700 is configured to control the operation of the compressor 610 based on the temperature of washing water sensed by the temperature sensing unit 335. For example, the controller 700 may be configured to control power to be applied to the electric heater 330 when the operating efficiency of the heat pump 600a is deteriorated. More specifically, the controller 700 may be configured to control power to be applied to the electric heater 330 when the temperature is less than a preset temperature even when a preset time elapses when the washing water is heated by the condenser 620. The controller 700 is provided with a timer 715 for calculating the heating time of the washing water.

By this configuration, the controller 700 controls the open-close valve 450 to open the connection pipe 440 when washing water is to be supplied into the sump 210. When the connection pipe 440 is opened, washing water is supplied into the sump 210. When water continues to be supplied into the sump 210, and the water level rises, and when the water level reaches a preset level so that the condenser 620 can be immersed, the controller 700 controls the open-close valve 450 to block the connection pipe 440.

When washing water inside the tub 140 is to be heated, the controller 700 controls the compressor 610 to be driven. When the compressor 610 is driven, refrigerant is compressed, and the compressed refrigerant is moved to the condenser 620. The refrigerant moved to the condenser 620 exchanges heat with washing water inside the tub 140 while moving along an internal passage of the condenser 620. The refrigerant heat-exchanged with the washing water of the tub 140 to release heat is condensed, and decompressed and expanded while passing through the expansion apparatus 630. The refrigerant that has through the expansion apparatus 630 is moved to the evaporator 640, and absorbs latent heat from an inside of the evaporator 640 to evaporate.

On the other hand, when it is desired to dry dishes inside the tub 140, the controller 700 control the compressor 610 to be driven so as to discharge the washing water of the sump 210 through the drain unit 410, and then move refrigerant to the condenser 620. The controller 700 may control the water valve 530 to supply washing water into the water jacket 500. When the supply of a predetermined amount of washing water into the washing water storage unit 510 of the water jacket 500 is completed, the controller 700 may control the water valve 530 to block the passage.

Refrigerant compressed by the compressor 610 is moved to the condenser 620 to heat a bottom surface of the tub 140 and air inside the tub 140. Air heated by the condenser 620 on the bottom surface of the tub 140 is moved to an upper region of the tub 140 by natural convection. At this time, the heated air comes into contact with dishes stored in the rack 160 while moving upward, thereby evaporating moisture on the surfaces of dishes, and allowing air inside the tub 140 to be in a high temperature and high humidity state. An inner wall of the tub 140 close to the water jacket 500 has a relatively low temperature than the other wall surfaces, and the hot and humid air inside the tub 140 is condensed in contact with an inner wall surface close to the water jacket 500. Condensate condensed on the wall surface is moved downward and collected into the sump 210.

On the other hand, the controller 700 may control the circulation fan 150 to be driven so as to promote air circulation in the tub 140. When the circulation fan 150 is rotated, the air of the tub 140 may be sucked into the suction port 156 and moved upward along the circulation duct 155, and then discharged into the tub 140 through the discharge port 157. As a result, the circulation of air inside the tub 140 may be promoted to promote the evaporation of moisture on the surfaces of dishes by the heated air as well as to promote the condensation process of humid air containing moisture by the water jacket 500, thereby promoting the drying of the dishes.

Hereinafter, another embodiment of the present disclosure will be described with reference to FIGS. 10 and 13.

Figure 10:
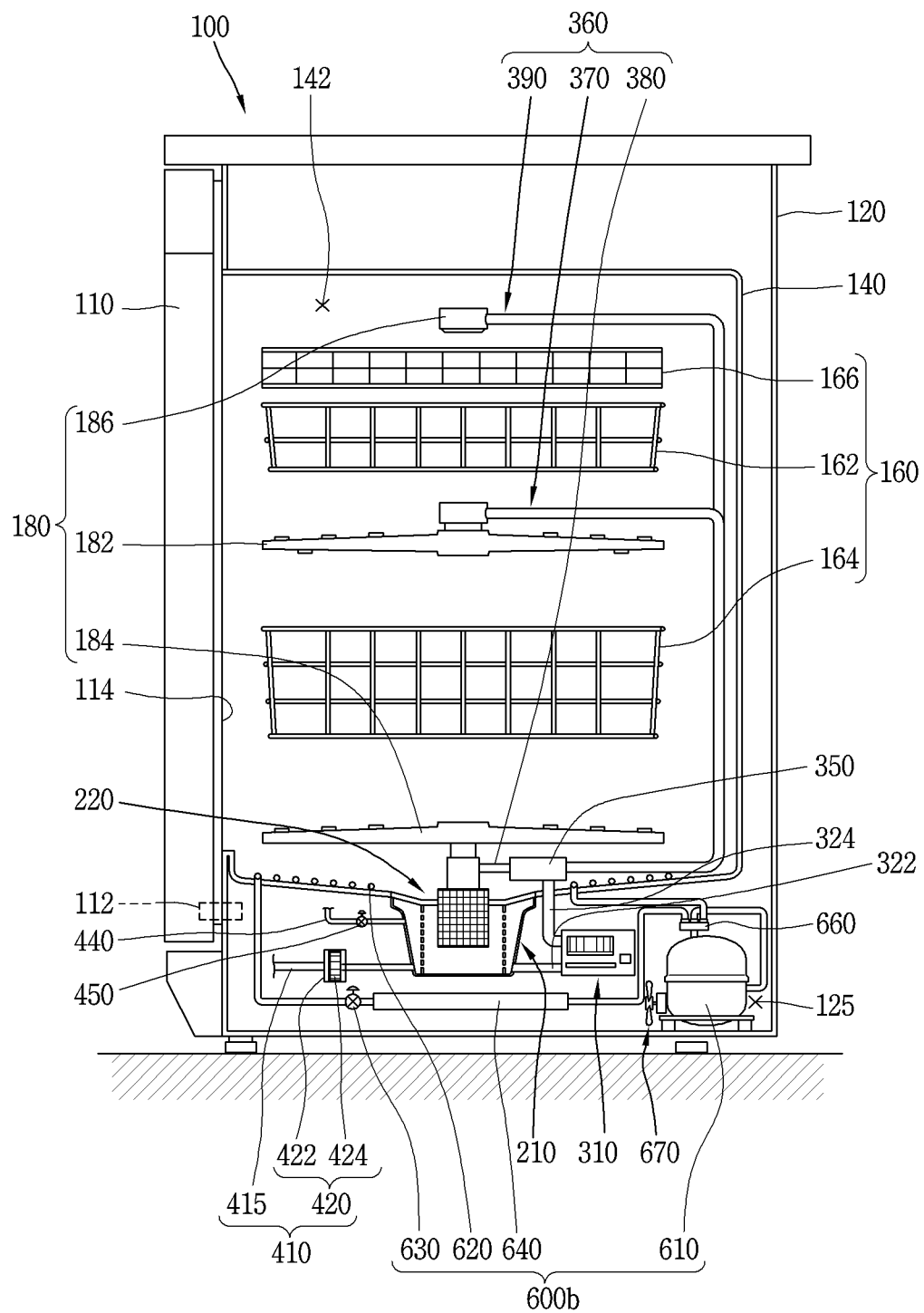
FIG. 10 is a cross-sectional view of a dishwasher having a heat pump according to another embodiment of the present disclosure.
Figure 11:
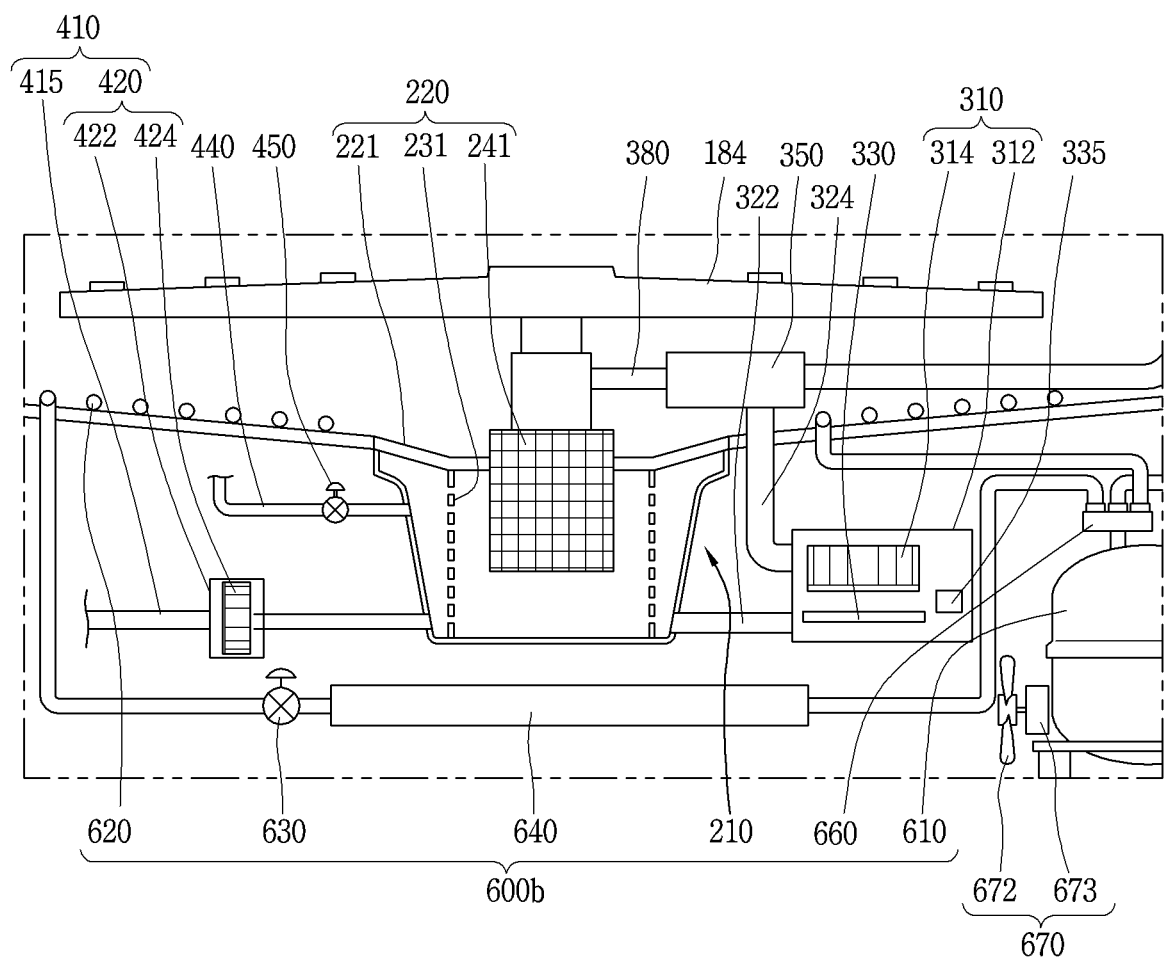
FIG. 11 is a partially enlarged view of FIG. 10.
Figure 12:
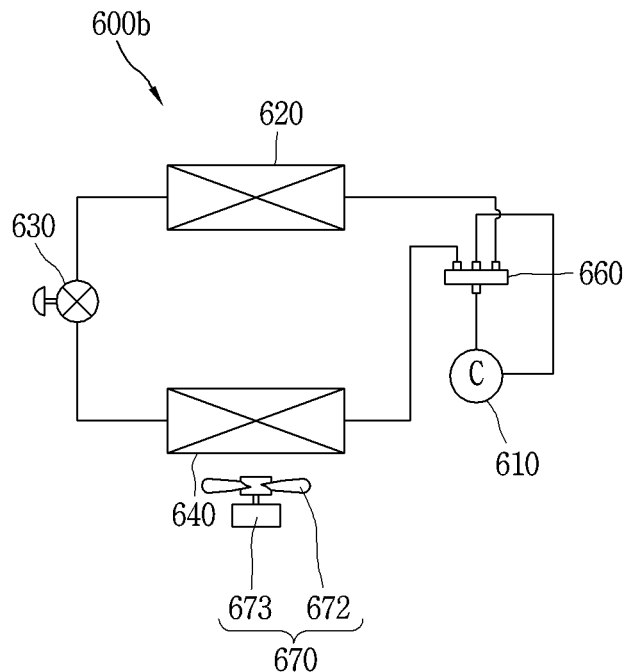
FIG. 12 is a cycle diagram of the heat pump in FIG. 10.

FIG. 10 is a cross-sectional view of a dishwasher having a heat pump according to another embodiment of the present disclosure, and FIG. 11 is a partially enlarged view of FIG. 10, and FIG. 12 is a cycle diagram of the heat pump in FIG. 10. As illustrated in FIGS. 10 and 11, the dishwasher of the present embodiment includes a dishwasher body 100 having a tub 140 configured with a washing space 142 therein and a sump provided at a bottom of the tub 140 to temporarily accommodate washing water; a heat pump 600*b* having a compressor 610, an evaporator 640, an expansion apparatus 630 and a condenser 620 provided on an inner bottom surface of the tub 140 to exchange heat with washing water inside the tub 140; and a controller 700 (see FIG. 10) configured to control the heat pump 600*b* to increase the temperature of the washing water inside the tub 140.

A door 110 is provided on a front surface of the dishwasher body 100. A washing space 142 is disposed inside the dishwasher body 100.

The rack 160 for accommodating dishes is provided inside the washing space 142. An inside of the washing space 142 is provided with a spray arm 180 for spraying washing water toward the rack 160.

A bottom surface of the tub 140 is disposed to be inclined, and the sump 210 is provided in a lower region of the bottom surface of the tub 140.

The sump 210 is disposed with a filter unit 220 for suppressing the movement of contaminants contained in washing water. The condenser 620 is provided on an inner bottom surface of the tub 140. The sump 210 is provided with a circulation pump 310 for circulating washing water. The sump 210 is provided with a drain unit 410 for draining washing water.

On the other hand, the heat pump 600*b* is provided with a refrigerant passage switching valve 660 for switching a passage of refrigerant. The refrigerant passage switching valve 660 is connected to a discharge side of the compressor 610. The condenser 620 is connected to one side of the refrigerant passage switching valve 660. Another side of the refrigerant passage switching valve 660 is connected to the evaporator 640. A suction side of the compressor 610 is connected to another side of the refrigerant passage switching valve 660. The refrigerant passage switching valve 660 switches the passage to selectively move refrigerant discharged from the compressor 610 to the condenser 620 or the evaporator 640 first. One side of the evaporator 640 is provided with a blower fan 670 for promoting the movement of air. As a result, the movement of air in contact with the evaporator 640 may be promoted, thereby promoting the heat exchange of the evaporator 640. The blower fan 670 includes a fan 672 having a plurality of blades and a motor 673 for rotatably driving the fan 672.

Figure 13:
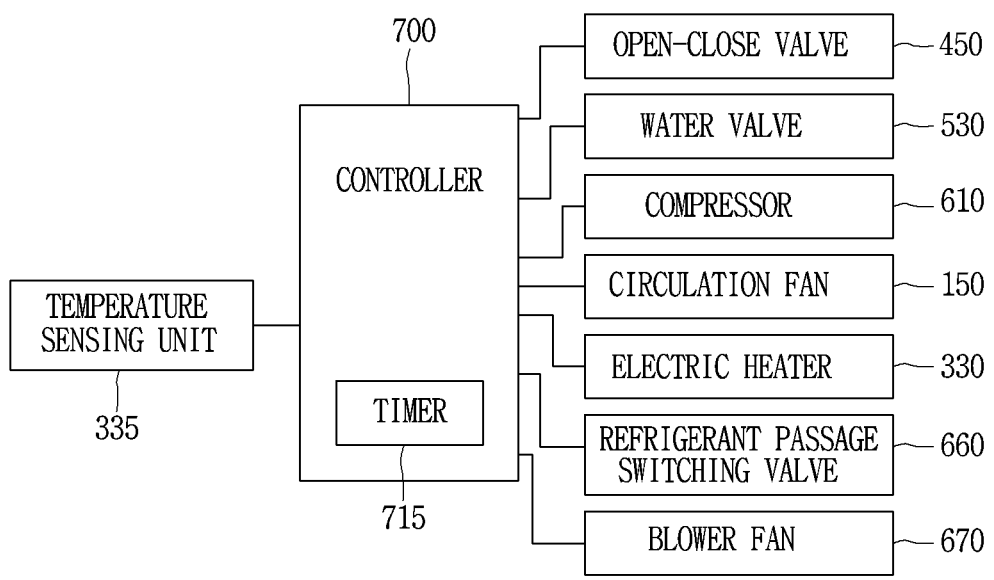
FIG. 13 is a control block diagram of the dishwasher in FIG. 10.

FIG. 13 is a control block diagram of the dishwasher in FIG. 10. As illustrated in FIG. 13, the controller 700 is communicatively connected to a temperature sensing unit 335 that senses the temperature of the washing water. The controller 700 includes a timer 715 for calculating a heating time of washing water. The controller 700 is controllably connected to the open-close valve 450 and the water valve 530 to control the supply of washing water. The compressor 700 is connected to the controller 700 to control the temperature of washing water. An electric heater 330 for heating washing water when power is applied is controllably connected to the controller 700. The controller 700 is controllably connected to a circulation fan 150 to promote the circulation of air inside the tub 140.

On the other hand, the controller 700 is controllably connected to a refrigerant passage switching valve 660 for switching a passage of the refrigerant to move the refrigerant of the compressor 610 to the condenser 620 or the evaporator 640. The controller 700 is configured to control the refrigerant passage switching valve 660 to move the refrigerant of the compressor 610 to the evaporator 640 when dishes are dried. According to this, the condenser 620 installed on a bottom surface of the tub 140 functions as the evaporator 640 to absorb surrounding latent heat, thereby cooling the bottom surface of the tub 140. As a result, moisture in the air inside the tub 140 is condensed and reduced to shorten the drying time.

By this configuration, the controller 700 may control the open-close valve 450 to supply a predetermined amount of washing water to the sump 210.

The controller 700 controls the compressor 610 to be driven when the washing water is to be heated using the condenser 620. Refrigerant compressed by the compressor 610 is moved to the condenser 620 to directly heat the washing water.

In order to dry dishes inside the tub 140, the controller 700 may control the compressor 610 to be driven to move refrigerant to the condenser 620. The refrigerant compressed by the compressor 610 is moved to the condenser 620 to heat a bottom surface of the tub 140 and air inside the tub 140.

When it is desired to dry dishes inside the tub 140, the controller 700 may control the compressor 610 to be driven to discharge the washing water of the sump 210 through the drain unit 410, and then move refrigerant to the condenser 620. The controller 700 may control the water valve 530 such that a predetermined amount of washing water is supplied into the water jacket 500.

The refrigerant compressed by the compressor 610 is moved to the condenser 620 to heat the bottom surface of the tub 140 and the air inside the tub 140. Air heated by the bottom surface of the tub 140 and the the condenser 620 is moved to an upper region of the tub 140 by natural convection. At this time, the heated air contains moisture evaporated from the surfaces of dishes while moving upward to be in a high temperature and high humidity state.

At this time, when air inside the tub 140 is in contact with a wall surface close to the water jacket 500, moisture is condensed. Condensate condensed on the wall surface of the tub 140 is moved downward and collected into the sump 210.

The controller 700 may control the circulation fan 150 to be driven so as to promote air circulation in the tub 140. When the circulation fan 150 is rotated, the circulation of air inside the tub 140 is promoted, thereby promoting the evaporation of moisture on the surfaces of dishes and the condensation process of air by the wall surface of the tub 140.

Meanwhile, the controller 700 may control the refrigerant passage switching valve 660 to move refrigerant compressed by the compressor 610 to the evaporator 640 when a preset period of time elapses. As a result, the refrigerant of the compressor 610 is moved to the evaporator 640 via the refrigerant passage switching valve 660 and condensed by heat radiation. The controller 700 may control the blower fan 670 to be driven when the refrigerant passage switching valve 660 is controlled to move the refrigerant of the compressor 610 to the evaporator 640. As a result, the heat radiation of refrigerant inside the evaporator 640 may be promoted.

The refrigerant condensed by being heat radiated by the evaporator 640 may be decompressed and expanded while passing through the expansion apparatus 630. The refrigerant that has passed through the expansion apparatus 630 is moved to the condenser 620. The refrigerant moved to the condenser 620 is evaporated by absorbing surrounding latent heat. As a result, the bottom surface of the tub 140 is cooled, and the air inside the tub 140 is in contact with the bottom surface of the tub 140 and the condenser 620, and moisture in the air is condensed on the bottom surface of the tub 140 and the surface of the condenser 620. As a result, the drying process of dishes may be promoted.

Hereinafter, still another embodiment of the present disclosure will be described with reference to FIGS. 14 to 17.

Figure 14:
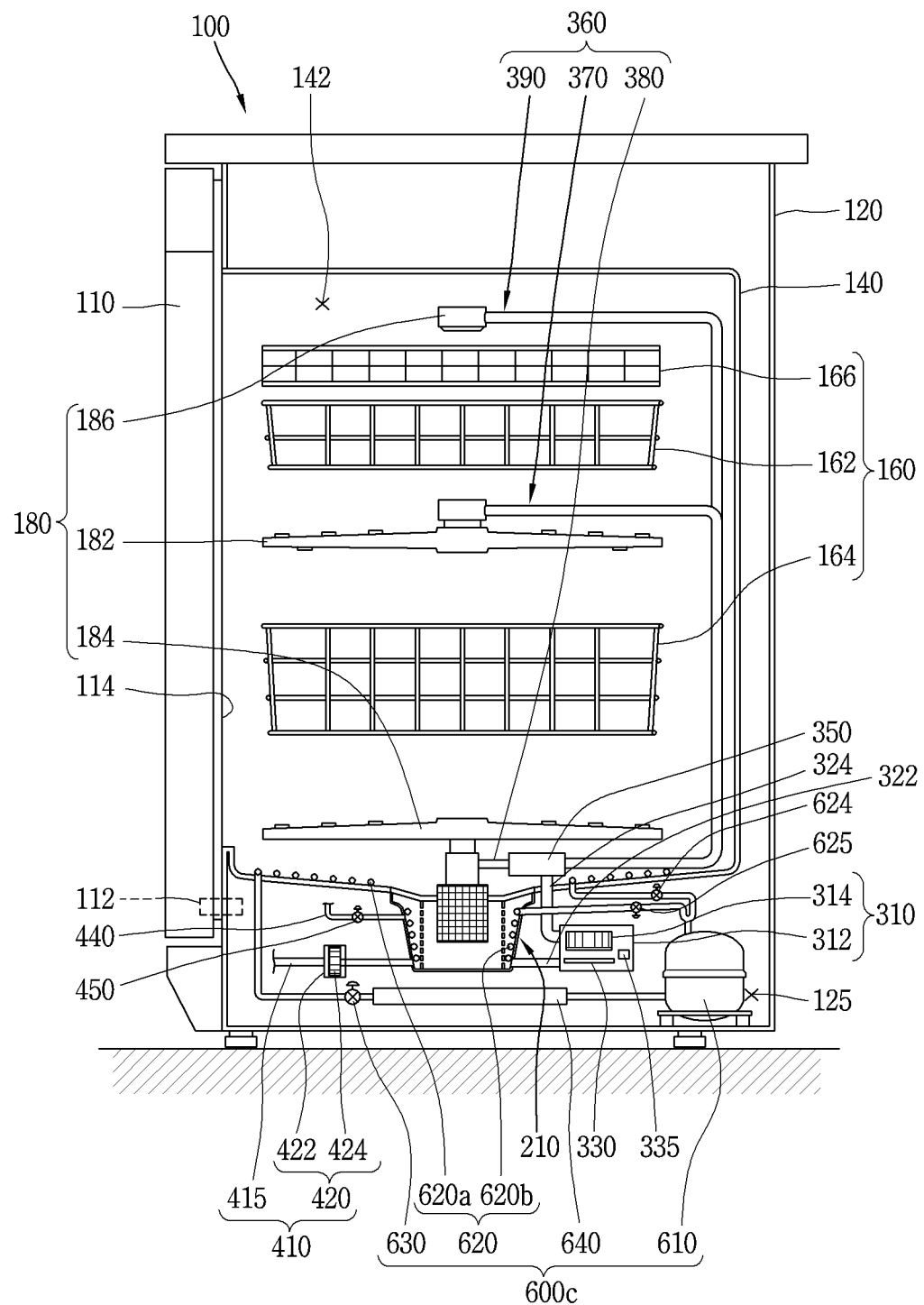
FIG. 14 is a cross-sectional view of a dishwasher having a heat pump according to still another embodiment of the present disclosure.
Figure 15:
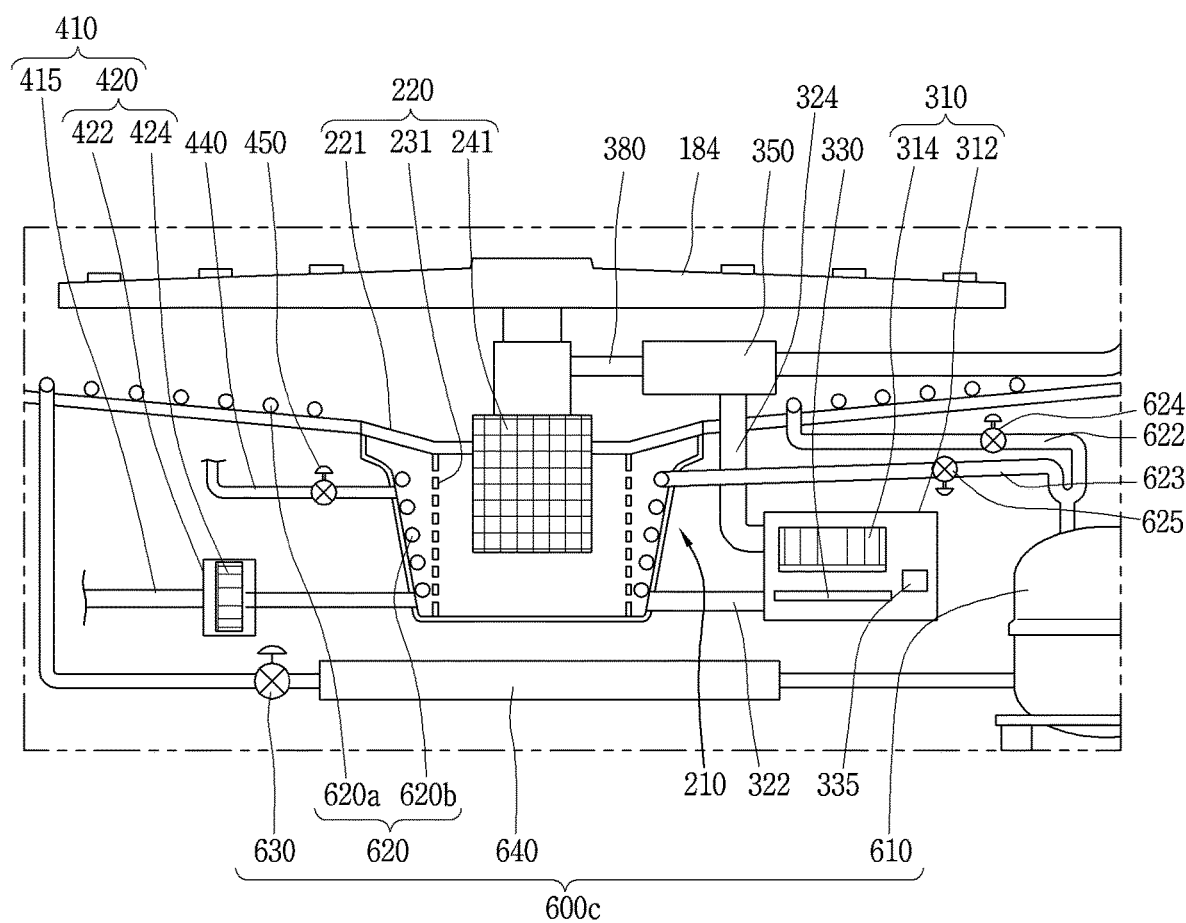
FIG. 15 is a partially enlarged view of FIG. 14.
Figure 16:
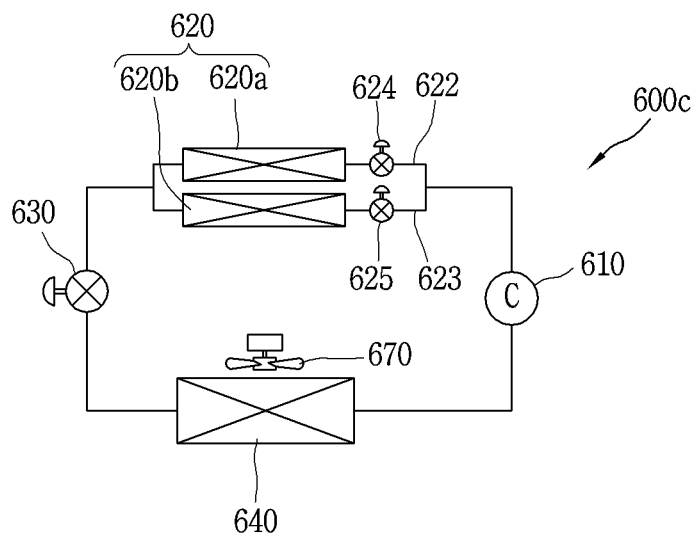
FIG. 16 is a cycle diagram of the heat pump in FIG. 14.

FIG. 14 is a cross-sectional view of a dishwasher having a heat pump according to still another embodiment of the present disclosure, and FIG. 15 is a partially enlarged view of FIG. 14, and FIG. 16 is a cycle diagram of the heat pump in FIG. 14. As illustrated in FIGS. 14 through 16, the dishwasher of the present embodiment includes a dishwasher body 100 having a tub 140 configured with a washing space 142 therein and a sump provided at a bottom of the tub 140 to temporarily accommodate washing water; a heat pump 600c having a compressor 610, an evaporator 640, an expansion apparatus 630 and a condenser 620 provided on an inner bottom surface of the tub 140 to exchange heat with washing water inside the tub 140; and a controller 700 (see FIG. 14) configured to control the heat pump 600c to increase the temperature of the washing water inside the tub 140.

The condenser 620 includes a tub condenser 620a disposed on a bottom surface of the tub 140 and a sump condenser 620b provided inside the sump 210. The tub condenser 620a is configured to be in direct contact with the washing water of the tub 140 to directly heat the washing water inside the tub 140. The sump condenser 620b is configured to be in direct contact with washing water inside the sump 210 to directly heat the washing water inside the sump 210. The sump condenser 620b is implemented in a spiral shape. The sump condenser 620b is disposed between the first filter 221 and the second filter 231. As a result, contaminants contained in the washing water may be prevented from approaching the sump condenser 620b.

The heat pump 600c includes a tub condenser valve 624 that opens and closes a refrigerant passage 622 introduced to the tub condenser 620a. The heat pump 600c includes a sump condenser valve 625 that opens and closes the refrigerant passage 623 introduced to the sump condenser 620b. In the present embodiment, it is illustrated a case where the tub condenser valve 624 and the sump condenser valve 625 are separately configured, but it is merely an example, and the tub condenser valve 624 and the sump condenser valve 625 may be implemented as a 3-way valve made of a single body.

Figure 17:
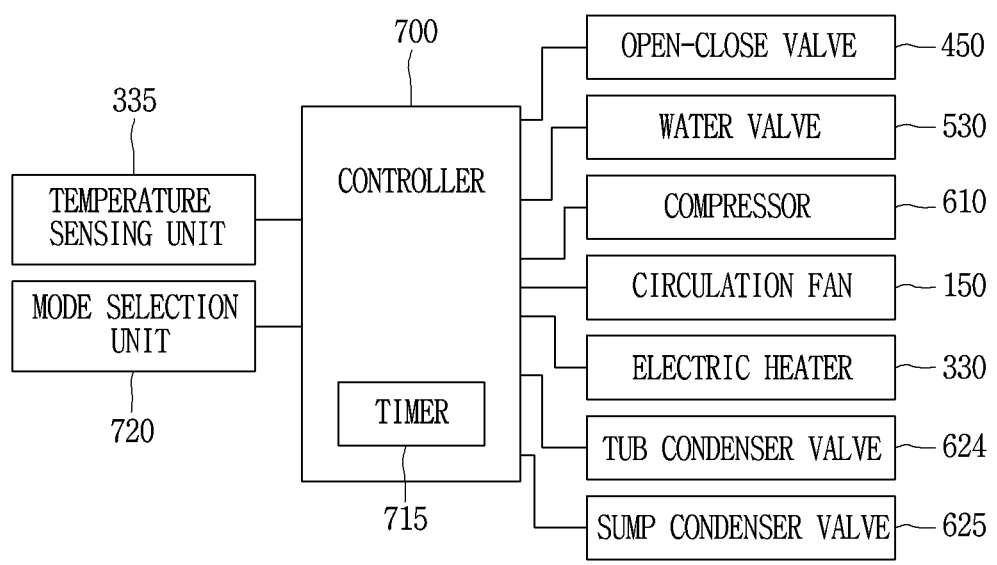
FIG. 17 is a control block diagram of the dishwasher in FIG. 14.

FIG. 17 is a control block diagram of the dishwasher in FIG. 14. As illustrated in FIG. 17, the controller 700 is communicatively connected to a temperature sensing unit 335 that senses the temperature of the washing water. The controller 700 includes a timer 715 for calculating time. The compressor 610 is controllably connected to the open-close valve 450 and the water valve 530 to control the supply of washing water. The compressor 610 and the electric heater 330 are controllably connected to the controller 700 to control the temperature of washing water.

On the other hand, the controller 700 is configured to control the movement of refrigerant compressed from the compressor 610 according to a plurality of operation modes.

A mode selection unit 720 is communicatively connected to the controller 700 to select at least one of the plurality of operation modes.

The plurality of operation modes include, for example, a washing water heating mode. The washing water heating mode includes, for example, a first heating mode for heating the washing water of the tub 140 using the tub condenser 620a. The controller 700 is configured to control the tub condenser valve 624 to move refrigerant to the tub condenser 620a when the first heating mode is selected by the mode selection unit 720.

The washing water heating mode includes, for example, a second heating mode for heating the washing water of the sump 210 using the sump condenser 620b. The controller 700 is configured to control the sump condenser valve 625 to move refrigerant to the sump condenser 620b when the second heating mode is selected by the mode selection unit 720. The controller 700 is configured to control the open-close valve 450 to supply washing water into the sump 210 when the second heating mode is selected. The second heating mode may be configured to supply a relatively small amount of washing water compared to the first heating mode. The second heating mode may be selected when, for example, the amount of dishes to be washed is less than that of the first heating mode.

The washing water heating mode may include, for example, a third heating mode for heating the washing water of the tub 140 and the washing water of the sump 210 using the tub condenser 620a and the sump condenser 620b. The controller 700 is configured to control the tub condenser valve 624 and the sump condenser valve 625, respectively, to move refrigerant to the tub condenser 620a and the sump condenser 620b, respectively, when the third heating mode is selected. The third heating mode may be selected, for example, when the amount of dishes to be washed is relatively large, or when the contamination degree of dishes is high, or when the outside air temperature is relatively low, compared to the first and second heating modes. The controller 700 is configured to control the open-close valve 450 to supply a predetermined amount of washing water or more so that the tub condenser 620a can be immersed when the third heating mode is selected.

The plurality of operation modes include, for example, a drying mode for heating a bottom surface of the tub 140. When the drying mode is selected, the controller 700 is configured to control the tub condenser valve 624 to move refrigerant to the tub condenser 620a.

Here, the mode selection unit 720 may be configured to select any one of the washing water heating modes and to select the drying mode.

By this configuration, the controller 700 may control the tub condenser valve 624 to allow the refrigerant passage to be opened so as to move the refrigerant of the compressor 610 to the tub condenser 620a when the first heating mode is selected by the mode selection unit 720.

When the second heating mode is selected by the mode selection unit 720, the controller 700 may control the open-close valve 450 to supply a predetermined amount of washing water into the sump 210. The controller 700 may control the sump condenser valve 625 to move the refrigerant of the compressor 610 to the sump condenser 620b. The refrigerant moved to the sump condenser 620b is condensed by exchanging heat with the washing water of the sump 210, and is moved to the evaporator 640 to absorb surrounding latent heat to evaporate.

When the third heating mode is selected by the mode selection unit 720, the controller 700 controls the open-close valve 450 to supply a predetermined amount of washing water. The controller 700 controls the tub condenser valve 624 and the sump condenser valve 625, respectively, to move the refrigerant of the compressor 610 to the tub condenser 620a and the sump condenser 620b, respectively. Refrigerant compressed by the compressor 610 is moved to the tub condenser 620a and the sump condenser 620b, respectively, to directly heat the washing water of the tub 140 and the washing water of the sump 210, respectively. As a result, the heating time of washing water may be significantly shortened.

Meanwhile, the controller 700 may control the tub condenser valve 624 to be opened and the sump condenser valve 625 to be blocked, respectively, to move the refrigerant of the compressor 610 to the tub condenser 620a during the drying of dishes. The controller 700 may control the water valve 530 to supply washing water into the washing water storage unit 510 of the water jacket 500 during the drying of dishes. The controller 700 may control the circulation fan 150 to be driven during the drying of dishes.

Hereinafter, another embodiment of the present disclosure will be described with reference to FIGS. 18 and 21.

Figure 18:
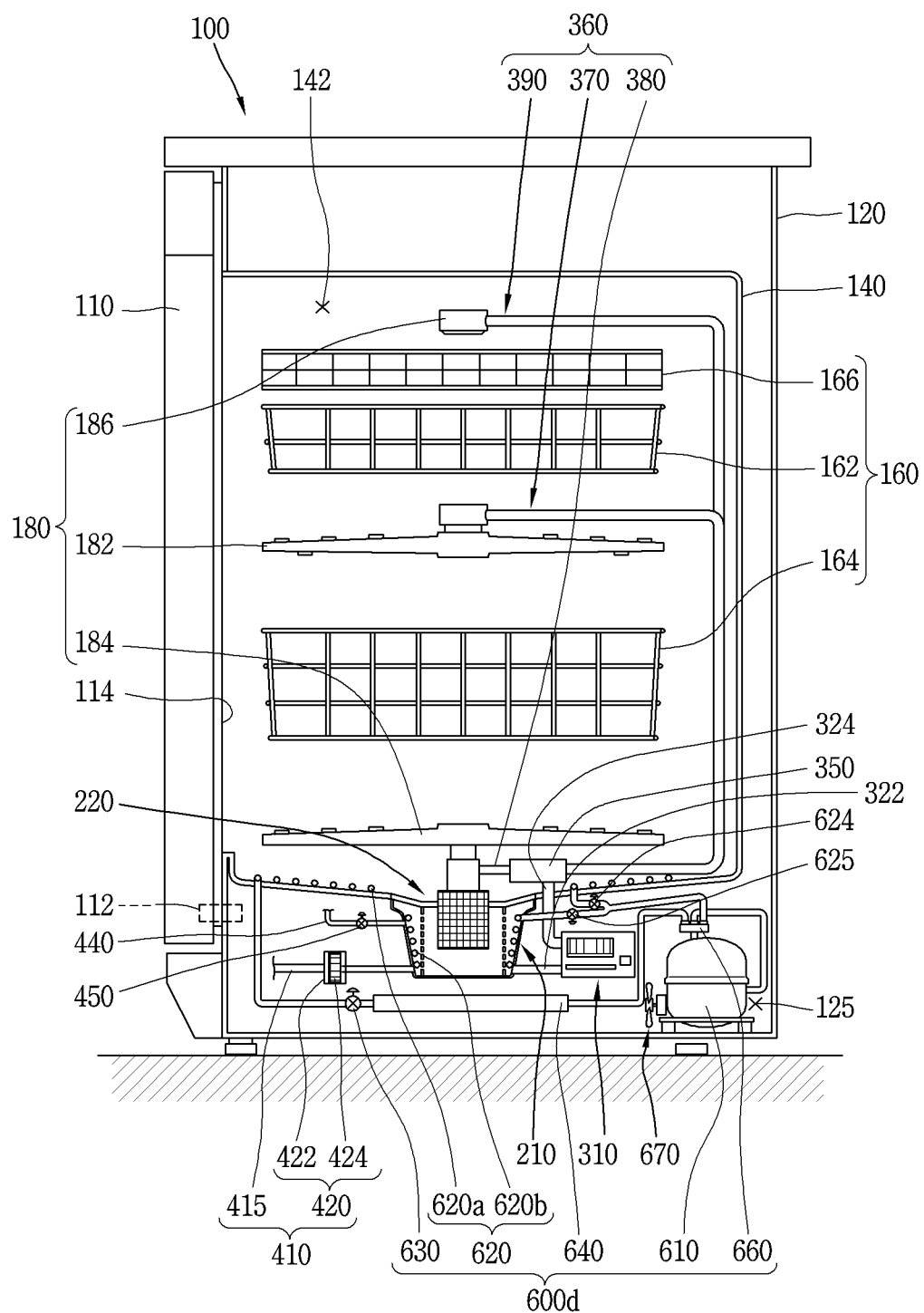
FIG. 18 is a cross-sectional view of a dishwasher having a heat pump according to yet still another embodiment of the present disclosure.
Figure 19:
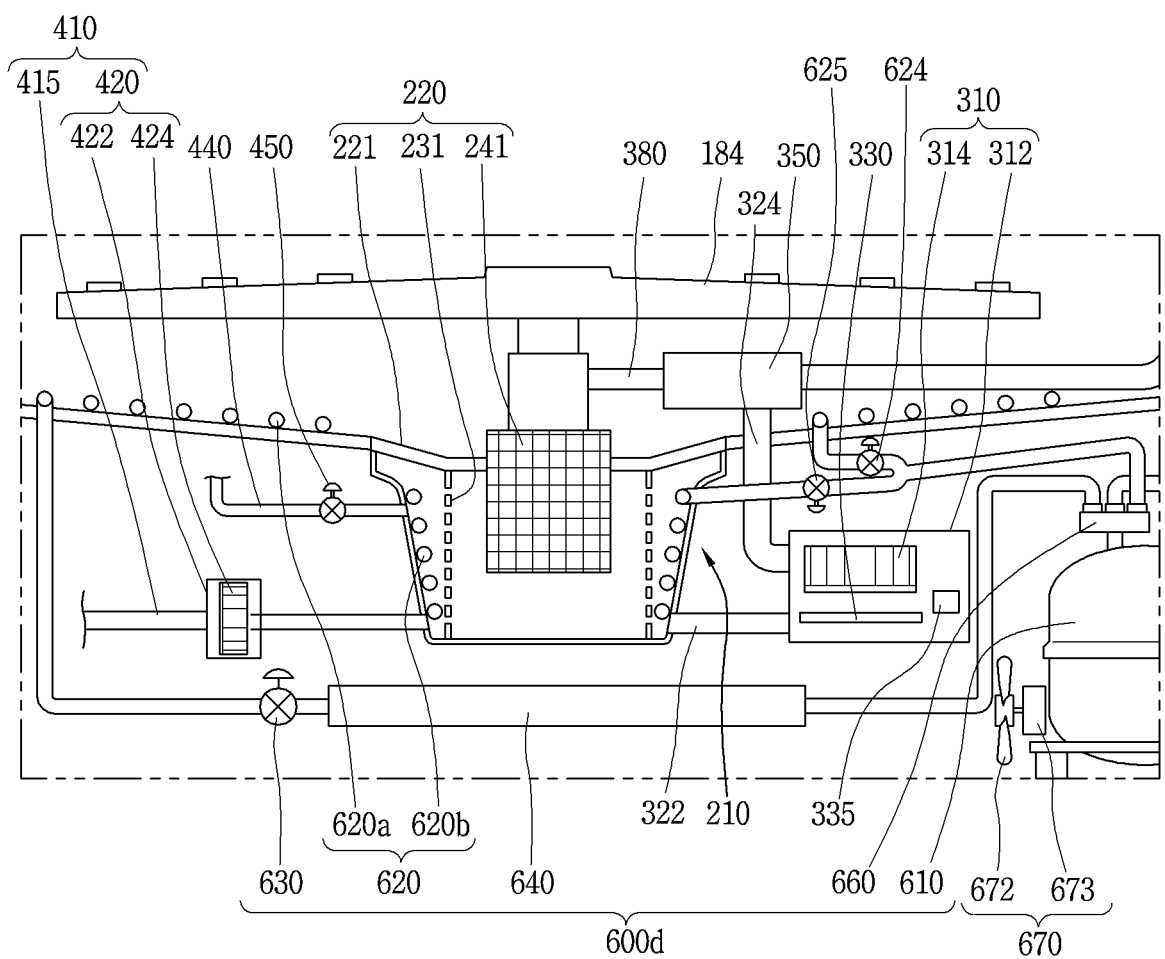
FIG. 19 is a partially enlarged view of FIG. 18.
Figure 20:
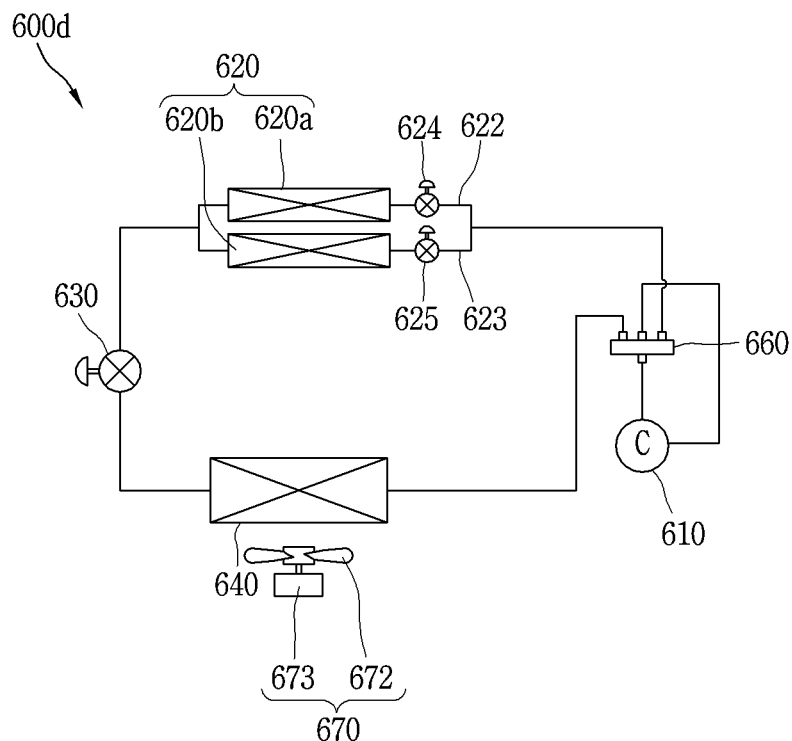
FIG. 20 is a cycle diagram of the heat pump in FIG. 18.

FIG. 18 is a cross-sectional view of a dishwasher having a heat pump according to still another embodiment of the present disclosure, and FIG. 19 is a partially enlarged view of FIG. 18, and FIG. 20 is a cycle diagram of the heat pump in FIG. 18. As illustrated in FIGS. 18 through 20, the dishwasher of the present embodiment includes a dishwasher body 100 having a tub 140 configured with a washing space 142 therein and a sump provided at a bottom of the tub 140 to temporarily accommodate washing water; a heat pump 600d having a compressor 610, an evaporator 640, an expansion apparatus 630 and a condenser provided on an inner bottom surface of the tub 140 to exchange heat with washing water inside the tub 140; and a controller 700 (see FIG. 18) configured to control the heat pump 600d to increase the temperature of the washing water inside the tub 140.

The condenser includes a tub condenser 620a disposed on a bottom surface of the tub 140 and a sump condenser 620b provided inside the sump 210. One side of the tub condenser 620a is provided with a tub condenser valve 624 that opens and closes the refrigerant passage. One side of the sump condenser 620b is provided with a sump condenser valve 625 that opens and closes the refrigerant passage.

On the other hand, the heat pump 600d is configured with a refrigerant passage switching valve 660 for switching a passage of refrigerant to selectively move the refrigerant of the compressor 610 to the condenser or the evaporator 640 first. The refrigerant passage switching valve 660 is connected to a discharge side of the compressor 610. One side of the refrigerant passage switching valve 660 is connected to the condenser side refrigerant passage. Another side of the refrigerant passage switching valve 660 is connected to the evaporator side refrigerant passage. A suction side of the compressor 610 is connected to another side of the refrigerant passage switching valve 660. One side of the evaporator 640 is provided with a blower fan 670.

Figure 21:
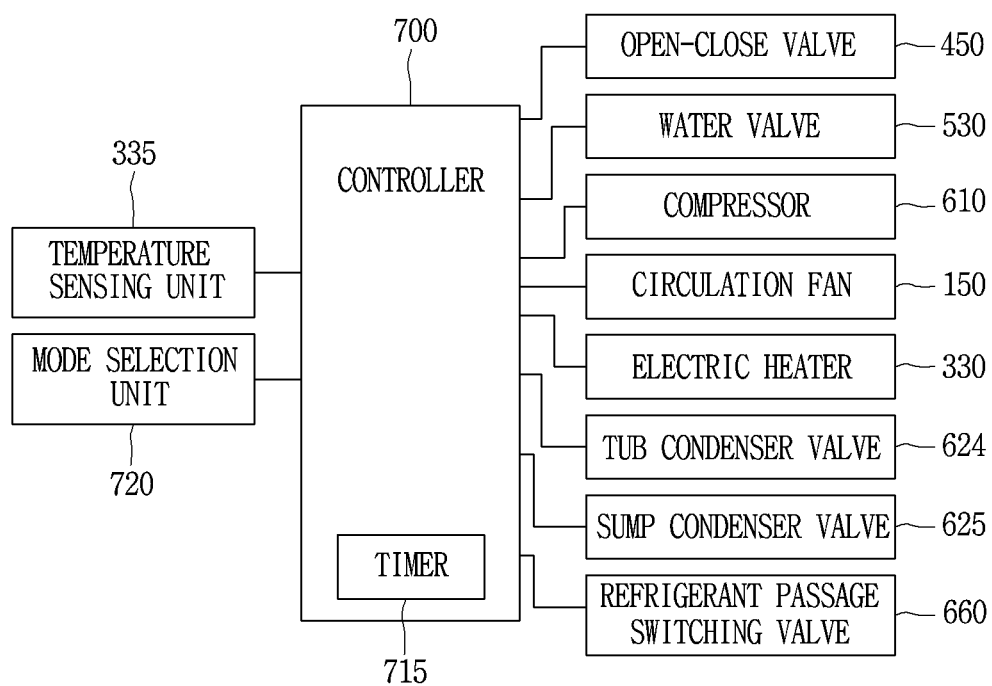
FIG. 21 is a control block diagram of the dishwasher in FIG. 18.

FIG. 21 is a control block diagram of the dishwasher in FIG. 18. As illustrated in FIG. 21, the controller 700 is communicatively connected to a temperature sensing unit 335 for sensing the temperature of washing water and a mode selection unit 720 for selecting a plurality of operation modes. The controller 700 includes a timer 715 for calculating time. The controller 700 is controllably connected to the open-close valve 450 and the water valve 530 to control the supply of washing water. The controller 700 is controllably connected to the compressor 610 and the electric heater 330 to control the temperature of washing water. The controller 700 is controllably connected to the circulation fan 150 and the blower fan 670, respectively, to control the movement of air.

Meanwhile, the controller 700 is controllably connected to the tub condenser valve 624, the sump condenser valve 625, and the refrigerant passage switching valve 660, respectively, so as to control a passage of refrigerant. The controller 700 is configured to switch the passage of refrigerant according to a plurality of operation modes. The plurality of operation modes include a washing water heating mode and a drying mode.

The washing water heating mode includes a first heating mode for heating washing water with the tub condenser 620a. The washing water heating mode includes a second heating mode for heating washing water with the sump condenser 620b. The washing water heating mode includes a third heating mode for simultaneously heating washing water with the tub condenser 620a and the sump condenser 620b.

In the drying mode, a bottom surface of the tub 140 and air are heated by the tub condenser 620a. When the drying mode is selected, the controller 700 is configured to control the tub condenser 620a, the sump condenser valve 625, and the refrigerant passage switching valve 660, respectively, to move the refrigerant of the compressor 610 to the tub condenser 620a. The controller 700 is configured to control the refrigerant passage switching valve 660 to move the refrigerant of the compressor 610d to the evaporator 640 first when a predetermined period of time elapses when the drying mode is selected.

By this configuration, the controller 700 may control the tub condenser valve 624 to allow the refrigerant passage to be opened so as to move the refrigerant of the compressor 610 to the tub condenser 620a first when the first heating mode is selected by the mode selection unit 720.

When the second heating mode is selected by the mode selection unit 720, the controller 700 may control the sump condenser valve 625 to move the refrigerant of the compressor 610 to the sump condenser 620b first.

When the third heating mode is selected by the mode selection unit 720, the controller 700 controls the tub condenser valve 624 and the sump condenser valve 625, respectively, to move the refrigerant of the compressor 610 to the tub condenser 620a and the sump condenser 620b, respectively. Refrigerant compressed by the compressor 610 is moved to the tub condenser 620a and the sump condenser 620b, respectively, to directly heat the washing water of the tub 140 and the washing water of the sump 210, respectively. As a result, the heating time of washing water may be significantly shortened.

The controller 700 may control the blower fan 670 to be driven during the operation of the compressor 610. As a result, the heat exchange of refrigerant inside the evaporator 640 may be promoted.

The controller 700 may control the tub condenser valve 624 to be opened to move the refrigerant of the compressor 610 to the tub condenser 620a first, and control the sump condenser valve 625 to be blocked to stop the refrigerant movement of the sump condenser 620b, respectively, during the drying of dishes. The controller 700 may control the water valve 530 to supply washing water into the washing water storage unit 510 of the water jacket 500 during the drying of dishes. The controller 700 may control the circulation fan 150 to be driven during the drying of dishes.

On the other hand, the controller 700 calculates the heating time of a bottom surface of the tub 140 and air by the tub condenser 620a during the drying of dishes, and controls the refrigerant passage switching valve 660 to move the refrigerant of the compressor 610 to the evaporator 640 first. Refrigerant discharged from the compressor 610 and moved to the evaporator 640 is condensed by heat radiation. The condensed refrigerant is moved to the tub condenser 620a via the expansion apparatus 630. The refrigerant moved to the tub condenser 620a absorbs surrounding latent heat to evaporate. As a result, the bottom surface of the tub 140 is cooled and moisture in the air inside the tub 140 is condensed, and thus the air inside the tub 140 is in a low-temperature, dry state. The refrigerant evaporated in the tub condenser 620a repeats the process of being sucked into the compressor 610 via the refrigerant passage switching valve 660.

As described above, preferred embodiments of the present invention are illustrated and described herein with reference to the accompanying drawings. However, the present disclosure may be implemented in various embodiments without departing from the concept or gist of the invention, and thus the foregoing embodiments should not be limited to the content of the detailed description.

Furthermore, the foregoing embodiments should be broadly construed within the scope of the technical concept defined by the appended claims even though they are not specifically disclosed in the detailed description herein. Moreover, all changes and modifications within the technical scope of the claims and the equivalent scope thereof should be construed to be included in the appended claims.

What is claimed is:

1. A dishwasher comprising:
a dishwasher body comprising a tub that defines a washing space and a sump that is disposed vertically below the tub and configured to receive washing water;
a heat pump comprising a compressor, an evaporator, an expansion apparatus, and a tub condenser disposed inside the tub, the tub condenser being disposed on an inner bottom surface of the tub and configured to exchange heat with washing water inside the tub; and
a controller configured to control the heat pump to be driven to thereby increase a temperature of washing water inside the tub,
wherein the heat pump further comprises:
a sump condenser disposed inside the sump,
a tub condenser valve configured to open and close an inlet side passage of the tub condenser, and
a sump condenser valve configured to open and close an inflow side passage of the sump condenser, and
wherein the controller is configured to control the tub condenser valve and the sump condenser valve, respectively, according to an operation mode selected from among a plurality of operation modes,
wherein the plurality of operation modes comprise a washing water heating mode for heating washing water, the washing water heating mode comprising a first heating mode for heating washing water in the tub using the tub condenser and a second heating mode for heating both of washing water in the tub and washing water in the sump using the tub condenser and the sump condenser, and
wherein the controller is configured to:
control the tub condenser valve to open to supply refrigerant to the tub condenser based on the operation mode corresponding to the first heating mode, and
control both of the tub condenser valve and the sump condenser valve to open to supply refrigerant to the tub condenser and the sump condenser based on the operation mode corresponding to the second heating mode.

2. The dishwasher of claim 1, further comprising:
a connection pipe configured to supply washing water into the washing space; and
an open-close valve configured to open and close the connection pipe,
wherein the controller is configured to:
control the open-close valve to supply washing water into the tub to a water level vertically above an upper end of the tub condenser, and
control the compressor to be driven such that the refrigerant compressed by the compressor is moved to the tub condenser to thereby heat washing water inside the tub.

3. The dishwasher of claim 1, wherein the controller is configured to, based on performing a drying process, control the compressor and the tub condenser to be driven to thereby heat the inner bottom surface of the tub by the tub condenser.

4. The dishwasher of claim 3, wherein the dishwasher body further comprises:
a water jacket configured to accommodate washing water and exchange heat with the tub;
a water pipe connected to the water jacket and configured to supply washing water to the water jacket; and
a water valve configured to open and close the water pipe, and
wherein the controller is configured to, based on performing the drying process, control the water valve to open the water pipe to supply washing water into the water jacket.

5. The dishwasher of claim 3, further comprising:
a circulation fan configured to circulate air inside the tub,
wherein the controller is configured to control the circulation fan to be driven based on performing the drying process.

6. The dishwasher of claim 3, wherein the heat pump further comprises a refrigerant passage switching valve that is disposed at a discharge side of the compressor and configured to control a passage of refrigerant discharged from the compressor, and
wherein the controller is configured to control the refrigerant passage switching valve to be open to supply refrigerant from the compressor to the evaporator based on an elapse of a predetermined time during the drying process.

7. The dishwasher of claim 6, further comprising:
a blower fan disposed at one side of the evaporator,
wherein the controller is configured to control the blower fan to be driven during operation of the compressor.

8. The dishwasher of claim 1, wherein the dishwasher body further comprises a water tank disposed vertically below the tub and configured to receive water, and
wherein the evaporator is configured to exchange heat with water inside the water tank.

9. The dishwasher of claim 1, wherein the tub condenser has a spiral shape and is in contact with the inner bottom surface of the tub.

10. The dishwasher of claim 1, wherein the sump defines an upper opening that communicates with the tub, and
wherein the tub condenser has a spiral shape, is in contact with the inner bottom surface of the tub, and surrounds a circumference of the upper opening of the sump.

11. The dishwasher of claim 1, wherein the washing water heating mode further comprises a third heating mode for heating washing water inside the sump using the sump condenser, and wherein the controller is configured to control the sump condenser valve to open to supply refrigerant to the sump condenser based on the operation mode corresponding to the third heating mode.

12. The dishwasher of claim 1, wherein the plurality of operation modes comprise a drying mode for heating the inner bottom surface of the tub, and wherein the controller is configured to control the tub condenser valve to open to supply refrigerant to the tub condenser based on the operation mode corresponding to the drying mode.

13. The dishwasher of claim 1, wherein the dishwasher body further comprises a water tank disposed between the tub and an upper side of the compressor and configured to receive water, and wherein the evaporator is configured to exchange heat with water inside the water tank.

14. The dishwasher of claim 13, further comprising a heat transfer member that is disposed between the water tank and the compressor, that is configured to carry water, and that is configured to transfer heat energy of the compressor to the water tank, the heat transfer member being made of metal and comprising a pipe configured to circulate water, and wherein at least a portion of the heat transfer member is disposed on a circumference of the compressor and configured to exchange heat with the compressor.

15. The dishwasher of claim 1, further comprises:

a circulation duct connected to the tub and configured to receive air from the tub and circulate air to the tub; and a circulation fan disposed inside the circulation duct.

16. The dishwasher of claim 15, wherein the tub defines:

a suction port disposed at an upper region of the tub and configured to introduce air from the tub to the circulation duct; and a discharge port disposed at a lower region of the tub and configured to discharge air from the circulation duct to the tub, and wherein the circulation fan is installed at the suction port.

17. The dishwasher of claim 1, wherein the dishwasher body defines a space configured to receive both of the compressor and the evaporator.

\* \* \* \* \*